(12) United States Patent
Hardiman et al.

(10) Patent No.: US 11,098,169 B2
(45) Date of Patent: Aug. 24, 2021

(54) PROCESSES FOR MAKING MASTERBATCHES OF RUBBER AND SILICA

(71) Applicant: Dynasol Elastómeros, S.A. de C.V., Altamira (MX)

(72) Inventors: Christopher J. Hardiman, Farmington, CT (US); Xuan Fu, Sugar Land, TX (US); Sergio Alberto Moctezuma Espiricueto, Altamira (MX); John Kounavis, Watertown, CT (US); Gabriela Elizabeth Blanco Reyes, Madero (MX); Julian Maldonado Valenzuela, Tampico (MX); José María Islas Manzur, Mexico City (MX); Gabriel Hernández Zamora, Tampico (MX)

(73) Assignee: Dynasol Elastómeros, S.A. de C.V., Altamira (MX)

( * ) Notice: Subject to any disclaimer, the term of this patent is extended or adjusted under 35 U.S.C. 154(b) by 91 days.

(21) Appl. No.: 16/319,554

(22) PCT Filed: Aug. 31, 2017

(86) PCT No.: PCT/IB2017/001196
§ 371 (c)(1),
(2) Date: Jan. 22, 2019

(87) PCT Pub. No.: WO2018/091955
PCT Pub. Date: May 24, 2018

(65) Prior Publication Data
US 2019/0263979 A1    Aug. 29, 2019

Related U.S. Application Data

(60) Provisional application No. 62/452,652, filed on Jan. 31, 2017, provisional application No. 62/382,248, filed on Aug. 31, 2016.

(51) Int. Cl.
| | | |
|---|---|---|
| *C08J 3/22* | (2006.01) | |
| *C08K 3/36* | (2006.01) | |
| *C08K 9/06* | (2006.01) | |
| *C08L 9/00* | (2006.01) | |
| *C09C 1/30* | (2006.01) | |

(52) U.S. Cl.
CPC ...... *C08J 3/22* (2013.01); *C08K 3/36* (2013.01); *C08K 9/06* (2013.01); *C08L 9/00* (2013.01); *C09C 1/30* (2013.01); *C09C 1/3081* (2013.01); *C01P 2006/12* (2013.01); *C01P 2006/19* (2013.01); *C08J 2307/00* (2013.01); *C08J 2309/02* (2013.01); *C08J 2309/06* (2013.01); *C08J 2311/00* (2013.01); *C08J 2323/16* (2013.01); *C08J 2491/00* (2013.01); *C08K 2201/006* (2013.01)

(58) Field of Classification Search
CPC ...... C08L 21/00; C08L 21/02; C08L 2314/00; C08K 3/36; C08K 9/06; C08J 3/16; C08J 3/22; C08J 2307/00; C08F 2/44; C08F 2/04; C08F 2/22; C09C 1/3081; C01P 2006/12; C01P 2006/19
USPC ........... 523/212–213, 351, 352; 524/492
See application file for complete search history.

(56) References Cited

U.S. PATENT DOCUMENTS

| | | | |
|---|---|---|---|
| 3,716,513 | A | 2/1973 | Burke |
| 3,768,537 | A | 10/1973 | Hess et al. |
| 3,840,382 | A | 10/1974 | Burke |
| 3,873,489 | A | 3/1975 | Thurn et al. |
| 4,072,701 | A | 2/1978 | Pletka et al. |
| 4,076,550 | A | 2/1978 | Thurn et al. |
| 4,099,981 | A | 7/1978 | Mui et al. |
| 5,205,972 | A | 4/1993 | Kafka |
| 5,440,064 | A | 8/1995 | Agostini et al. |
| 5,711,904 | A | 1/1998 | Eswaran et al. |
| 5,763,388 | A | 6/1998 | Lightsey et al. |
| 5,908,660 | A | 6/1999 | Griffith et al. |
| 5,919,298 | A | 7/1999 | Griffith et al. |
| 5,985,953 | A | 11/1999 | Lightsey et al. |
| 6,180,710 | B1 | 1/2001 | Hergenrother et al. |
| 6,342,552 | B1 | 1/2002 | Hergenrother et al. |
| 6,342,560 | B1 | 1/2002 | Okel |
| 6,407,153 | B1 | 6/2002 | Von Hellens |
| 6,465,670 | B2 | 10/2002 | Thise et al. |
| 6,521,691 | B1 | 2/2003 | Agostini et al. |
| 6,559,329 | B2 | 5/2003 | Pohl et al. |
| 6,579,929 | B1 | 6/2003 | Cole et al. |
| 6,617,325 | B1 | 9/2003 | Lehmann-Lintz et al. |
| 6,646,028 | B2 | 11/2003 | Lehmann-Lintz et al. |
| 6,649,684 | B1 | 11/2003 | Okel |
| 6,713,534 | B2 | 3/2004 | Goerl et al. |
| 6,720,369 | B2 | 4/2004 | Goerl et al. |
| 6,736,891 | B1 | 5/2004 | Bice et al. |
| 6,740,704 | B2 | 5/2004 | Konno et al. |
| 6,822,045 | B2 | 11/2004 | Miyatake et al. |

(Continued)

FOREIGN PATENT DOCUMENTS

| | | |
|---|---|---|
| JP | 2005075900 A | 3/2005 |
| WO | WO 2007040143 A1 | 4/2007 |

OTHER PUBLICATIONS

Machine translated English equivalent of JP 2005-75900, dated Mar. 2005.

*Primary Examiner* — Hannah J Pak
(74) *Attorney, Agent, or Firm* — Stephen S. Hodgson

(57) ABSTRACT

A process is provided for making a silica masterbatch, that contains silica and solution-made rubber. The silica masterbatch has physical properties similar to those found in a comparable dry-mixed composition, but the silica masterbatch can be incorporated more easily and less expensively into tires and other rubber products than the dry-mixed composition. A process is also provided for making a masterbatch of silica, a solution-made rubber and an emulsion-made rubber.

24 Claims, No Drawings

(56) References Cited

U.S. PATENT DOCUMENTS

| | | |
|---|---|---|
| 7,056,449 B2 | 6/2006 | Hoefler |
| 7,101,922 B2 | 9/2006 | Chen et al. |
| 7,307,121 B2 | 12/2007 | Zhang et al. |
| 7,312,271 B2 | 12/2007 | Chen et al. |
| 7,619,028 B2 | 11/2009 | Watanabe et al. |
| 7,790,798 B2 | 9/2010 | Chen et al. |
| 8,357,733 B2 | 1/2013 | Wallen et al. |
| 8,835,536 B2 | 9/2014 | Debnath et al. |
| 8,865,799 B2 | 10/2014 | Wallen et al. |
| 9,738,776 B2 | 8/2017 | Hardiman et al. |
| 10,344,146 B2 * | 7/2019 | Hardiman ............... C08F 2/44 |
| 2003/0114559 A1 | 6/2003 | Su et al. |
| 2003/0119946 A1 | 6/2003 | Chen et al. |
| 2004/0014869 A1 | 1/2004 | Wong et al. |
| 2005/0009955 A1 | 1/2005 | Cohen |
| 2006/0086450 A1 | 4/2006 | Hogan et al. |
| 2007/0155861 A1 * | 7/2007 | Chen ..................... C08J 3/226 |
| | | 523/351 |
| 2007/0155890 A1 | 7/2007 | Chen et al. |
| 2008/0004375 A1 | 1/2008 | Kondo et al. |
| 2008/0113206 A1 | 5/2008 | Hoy et al. |
| 2008/0227910 A1 | 9/2008 | Odaka |
| 2009/0163633 A1 | 6/2009 | Ko et al. |
| 2010/0022684 A1 | 1/2010 | Wallen et al. |
| 2012/0322925 A1 | 12/2012 | Arigo et al. |
| 2013/0203915 A1 | 8/2013 | Arigo et al. |
| 2015/0011678 A1 | 1/2015 | Bibette et al. |
| 2015/0031796 A1 | 1/2015 | Debnath et al. |
| 2015/0252176 A1 * | 9/2015 | Hardiman ............... C08K 9/06 |
| | | 523/351 |
| 2019/0322841 A1 * | 10/2019 | Hardiman ............... C08L 21/00 |

\* cited by examiner

PROCESSES FOR MAKING MASTERBATCHES OF RUBBER AND SILICA

CROSS REFERENCE TO RELATED APPLICATIONS

This is a national stage application filed under 35 U.S.C. 371 for International Application No. PCT/IB2017/001196, which was published as Publication No. WO 2018/091955 A2, which is incorporated by reference. This application claims priority to U.S. Provisional Patent Application Ser. Nos. 62/382,248 filed Aug. 31, 2016, and 62/452,652 filed Jan. 31, 2017, each of which is incorporated by reference.

FIELD OF THE INVENTION

This invention pertains to versatile processes for making silica-filled-rubber masterbatches that include silica, which is hydrophobated with a silane compound, in rubber made using a solution process and/or in rubber made using an emulsion process. The masterbatches are useful for making rubber formulations, particularly for making tires.

BACKGROUND OF THE INVENTION

Rubber is made in an emulsion or wet process in water or in a solution process in an organic solvent. Various monomers can be used and are polymerized in a free-radical polymerization process for emulsion rubber or an anionic polymerization process for solution rubber. In a typical application for the emulsion process, styrene and butadiene monomers are mixed together in water and additives including a modifier, an emulsifier and an activator are added to the solution to form a feed stream. The feed stream is fed to a heat exchanger that removes heat from the feed stream. An initiator is added, and the feed stream with the initiator flows through a series of stirred reactors. Polymerization occurs as the material flows through the reactors and continues as long as styrene and butadiene monomer units are available in the solution. To stop the polymerization at a desired polymer chain length, a short-stopping agent, such as hydroquinone, is added. The reactor product stream flows into a blowdown tank, and steam is added to strip out styrene and butadiene monomer. An aqueous latex is collected in tanks. A coagulating agent is added to the tanks, and a rubber crumb is formed, recovered, dried and baled for shipment to a tire or other manufacturer of final rubber products.

In a typical application for the solution process, styrene and butadiene monomers are initiated by alkyl lithium compounds in an organic solvent and are polymerized via anionic polymerization. A nitrogen blanket is typically required for the polymerization process. Randomization agents are usually added to produce a random copolymer. The microstructure of the copolymer, including vinyl content, molecular weight distribution and end-chain or in-chain functionalization, may be fine-tuned under different reaction conditions. After the polymerization process, the polymer solution is flash-distilled to form a more concentrated solution, which is then distilled with steam to remove the organic solvent and yield a rubber crumb. Dispersants and coagulants are generally added in the aqueous phase to control the size of the crumb. The crumb may be further stripped by steam and then filtered, dried and baled for sale.

In making tires and other rubber products, it is desirable to mix silica with an elastomer or rubber to improve certain properties of the elastomer. It is well known to incorporate silica into rubber using a dry mixing process, where a material is put on the surface of the silica during the mixing process to allow it to blend into the rubber. When the silica is coated with such an agent, the silica is referred to as hydrophobated and any material used to make hydrophobated silica is a hydrophobating agent. Silane compounds have been developed as hydrophobation agents. Processes for incorporating silica into rubber using the dry mixing process have been effective, but are time-consuming and energy-intensive. In the dry mixing process, rubber, silica, a silane and some of the compounding ingredients are fed into a Banbury rubber mixer, where the silica reacts with the silane to form a reaction mix compound. This pass may take 10 minutes or longer and greatly reduces the efficiency of the mixing operation. The mixing process requires a great deal of time, capital and operating and maintenance expense. Further, ethanol from the silane must be removed in the mixing step or in a downstream processing step. Rubber mixing facilities are not designed to function as chemical plants, and extra equipment must be installed to either isolate or to burn the alcohol so as to meet environmental standards. The reaction mix compound is further mixed in a remill step, where additional ethanol may be removed and additional compound ingredients may be added. This pass, however, is used primarily to improve the dispersion of the silica and reduce the Mooney viscosity of the stock. The remilled stock is combined with curatives in a final mix to produce a rubber compound suitable for use in tire tread stock.

Rather than mixing silica into rubber after the rubber has been made, silica can be added to the process in which rubber is made to make a silica-rubber masterbatch. One problem in making a silica-rubber masterbatch is when untreated silica is added to an emulsion of styrene-butadiene rubber or SBR (the emulsion or wet process) or to a solution of SBR in an organic solvent (the solution process), the silica does not completely incorporate into the polymer and separates as fines when coagulated. These fines not only reduce the value of the masterbatch, but also cause a processing problem in that the fines have to be disposed of or recycled.

Silica-filled rubber masterbatch has been made successfully by incorporating the silica into rubber as the rubber is made in an emulsion process. Silica can be hydrophobated efficiently in an aqueous setting with common silane compounds. In the tire industry, silane compounds that contain sulfur are commonly used because the sulfur provides active sites for coupling the silane compound to the polymer chains in the mixing steps. The dispersion of silica in rubber is strongly dependent on the degree of hydrophobation of the silica. The dispersion of the silica in the polymer can strongly influence the final properties of the rubber compound, such as wet traction, rolling resistance, and tread wear. It is often advantageous to make a silica-rubber masterbatch and dilute it down to a desired level of silica during mixing with rubber that does not contain silica, and thus avoid poor performance of a final rubber product due to a poor dispersion of silica in the rubber, which can occur in dry mixing for a variety of reasons.

U.S. Pat. No. 8,357,733, issued to Wallen et al., discloses a process for hydrophobating silica and a process for making a silica-filled-rubber masterbatch using rubber made in an emulsion process. The silica was hydrophobated to make it compatible with the rubber, and a hydrophobation agent was used that binds to rubber in a vulcanization process for incorporating the silica into a final rubber product, particularly a tire. U.S. Patent Application Pub. Nos. 20120322925, 20130203914 and 20130203915 disclose a process for hydrophobating silica and for making silica-rubber masterbatch with various elastomers in aqueous conditions. The hydrophobation process of the silica is performed with a silane compound, and the hydrophobated silica is mixed into a latex and incorporated into rubber during coagulation in an emulsion process. U.S. Pat. No. 9,738,776, issued to Hardiman et al., discloses processes for making a silica-filled-rubber masterbatch that contains silica, emulsion-made rubber and solution-made rubber and is incorporated by reference.

Rubber product manufacturers, including tire manufacturers, prefer to incorporate some rubber made using a solution process into their products for particular properties that solution-made rubber imparts in the final product, particularly in tires. Although it has not been possible, or at least not economical, to make a silica-rubber masterbatch similar to the one disclosed in the U.S. Pat. No. 8,357,733 patent using rubber made in a solution process, where the rubber is made in an organic solvent, efforts have been made to provide a mixture of silica and solution-made rubber. U.S. Pat. No. 7,307,121, issued to Zhang, treats silica in an organic solvent with a mercaptosilane and a silane coupling agent such as bis(triethoxysilylpropyl) disulfide (TESPT). The treated silica is blended into an organic solution of SBR, and a masterbatch of solution-made rubber and silica is recovered by steam stripping to remove solvent. U.S. Pat. No. 6,025,415, issued to Scholl, describes a process for the production of mixtures of solution rubbers and surface-modified oxidic or siliceous fillers. Solution rubbers were mixed with surface-treated silica in solvent, and both were added dropwise into hot water and steam to form a uniformly distributed silica mix. U.S. Pat. No. 6,713,534, issued to Goerl et al., describes a process for making a fine-particle rubber powder, which included suspending one or more silicatic fillers and one or more bifunctional organosilicon compounds or a silicatic filler modified with an organosilicon compound in water to obtain a suspension, which was adjusted to a pH of 5 to 10. Rubber, which was made by the solution and/or the emulsion process, was dissolved in an organic solvent, and the resulting solution was added to the suspension. The organic solvent was removed to obtain a rubber powder in water, and the water was removed to obtain the fine-particle rubber powder. U.S. Pat. No. 7,790,798, issued to Chen, describes a method for making a silica-rubber masterbatch that contained a diene elastomer and silica in an organic solvent. An unhydrophobized precipitated silica having a first average particle size was mixed and ground in a first organic solvent, and a ground silica slurry having a reduced second average particle size was formed. The ground silica slurry was mixed with a diene elastomer in a second organic solvent; and the solvent was removed to form a solution masterbatch preparation.

A silica-filled-rubber masterbatch has not been commercialized that uses only rubber made in a solution process, without rubber made in an emulsion process. Consequently, there remains a need for a silica-filled-rubber masterbatch that contains rubber made using a solution process, where the masterbatch can be economically manufactured and where the silica is hydrophobated in a manner such that the silica will become sufficiently homogeneously mixed into the rubber and bound to the rubber during curing to produce a vulcanizate having acceptable properties.

SUMMARY OF THE INVENTION

In one embodiment, precipitated silica is hydrophobated by a silane coupling agent using a reflux method at the boiling point of a solvent. After several hours, the mixture is cooled and a dispersants are added to prevent caking of the hydrophobated silica.

In another embodiment, the hydrophobated silica is mixed with concentrated solution rubber in solvent. Performance enhancers, processing aids, or other additives that are useful to enhance the properties of masterbatch can be added.

In another embodiment, these additives can be added after the hydrophobation process but before a stripping and coagulation process.

In one embodiment, granular or micro pearl grades of silica are hydrophobated and stripped and coagulated with solution-made rubber. In this process dispersant and coagulants are both used to control the crumb size, which usually is large enough for regular industrial production. In another embodiment, silica is milled first and then hydrophobated and then stripped/coagulated together with solution-made rubber. Due to the smaller size, a greater amount of coagulants than is typically used is used to create crumbs large enough for typical industrial production.

In another embodiment of the present invention, solution-rubber and silica crumb is mixed with an emulsion latex, with or without silica, and then coagulated to form a silica masterbatch, which can be made at desired ratios of silica, solution-made rubber and emulsion-made rubber. In another embodiment, wet solution-rubber masterbatch crumb can also be fed directly into a drying process together with emulsion-rubber masterbatch crumb at any desired ratio to obtain dried masterbatches.

In another embodiment, a solution-rubber solution is mixed with cationic, anionic, or non-ionic emulsifiers and is mixed intensely. The solvent is later removed by vacuum distillation and a stable emulsion latex is formed. This solution-rubber latex is mixed with an emulsion-rubber latex at any desired ratio and is homogenized. The latex is later coagulated together with hydrophobated silica in water and a masterbatch of silica, solution rubber and emulsion rubber is obtained.

BRIEF DESCRIPTION OF THE INVENTION

The present invention provides processes for making masterbatches of a silica and a rubber made in a solution process. In one embodiment, the silica is suspended in a solvent, preferably a low boiling point solvent, such as hexane or cyclohexane, which is commonly used to make solution rubber. A desired type of silane is added into the suspension and then the mixture is heated to the boiling temperature of the solvent. Agitation is provide during this reflux period which lasts a couple to a few hours. After this phase is complete, the silica is hydrophobated and the suspension is allowed to cool back to room temperature. A dispersant soluble in the solvent of choice is later added to prevent the silica from clumping together. Other desired ingredients, such as process oil, can be added after the hydrophobation stage, preferably with sufficient agitation to keep all the ingredients suspended.

In another embodiment, a concentrated solution rubber solution is gradually added into the hydrophobated silica solution. The mixture is constantly under agitation and a uniform suspension is achieved. It is important to adjust the solution viscosity of the material to make it processible for the next stage. A surprising finding is that a soluble dispersant helps with the suspension and an additional dosage can be added if needed. Other desired ingredients, such as process oil, can also be added in this stage. The increased solution viscosity in this stage will help to suspend the insoluble ingredients.

In one embodiment, the described mixture of solution rubber and silica is stripped and coagulated to form web crumbs. The typical stripping and coagulation conditions in a solution rubber plant is suitable for this material. For example, the material can be fed into a hot water bath or into steam. The temperature of the hot water must be higher than the solvent of choice, which will evaporate the solvent and the crumbs form. In a typical industrial setting, a dispersant is typically used in this stage in order to prevent the crumbs coming together to form very large pieces. It was unexpectedly found that the silica masterbatch made with solution rubber showed the opposite behavior, where the crumbs are typically very small. In addition, a lot of fines are created during the process, which quickly becomes a processing issue. Silica losses were also observed, perhaps due to the difficulties to collect fines. A surprising finding is that inorganic or organic coagulants are very effective to control the crumb size in this stage. With enough coagulants added, the crumb size increases and the processibility also increases. The size of the crumb also depends on the size of the silica. Smaller silicas create smaller crumbs, which require more coagulants to smooth out the process.

In another embodiment, a solution-rubber solution is mixed with suitable emulsifiers and water, and thus is emulsified. The emulsifiers are added gradually and is stirred with the solution rubber solution. Afterwards, high-shear mixing is applied. The emulsified solution rubber contains both water and solvent at this stage. This latex form then undergoes a vacuum distillation process where the solvent is removed and a latex containing only water as the medium is obtained. The obtained latex can be mixed with an emulsion rubber of choice with strong agitation to form a stable latex mixture, which can then mixed with the hydrophobated silica made in water, and is coagulated, washed, and baled. Alternatively, the obtained solution rubber latex can be mixed with hydrophobated silica made in water alone without emulsion rubber latex and is coagulated together with silica to form a solution-rubber-only masterbatch. Process oil and/or other necessary ingredients can be added at any stage, but are most typically added during the coagulation stage.

Silica can be hydrophobated with a water soluble or water/alcohol soluble silane or silane reaction product, where the water/alcohol mixture (or water/alcohol/acid mixture) contains at least about 75% water, and where the soluble silane or silane reaction product is capable of hydrophobating silica. In addition to 3-mercaptopropyl trimethoxy silane, methoxy substituted silanes with the structure shown below as Formula 1 have been found to successfully hydrophobate the silica in a wet process for silica masterbatch:

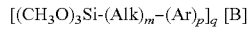  Formula 1 where

B is —SCN, R—C(=O)S, (if q=1) or $S_X$ (if q=2);

Alk is a straight chained or branched bivalent hydrocarbon radical;

R is an alkyl group containing 1 to 18 carbons;

m is 0 or 1; p is 0 or 1; m+p=1; q=1 or 2;

Ar is an arylene radical having from 6 to 12 carbon atoms; and

X is a number from 2 to 8; and where the silane or its reaction product with water is substantially soluble in alcohol/water mixtures containing at least about 75 wt % water. The alcohol/water mixture preferably includes a small amount of a weak acid such as acetic acid or oxalic acid. Surprisingly, it has been found that also ethoxy substituted silanes with similar structure as shown in Formula 1 successfully hydrolyze in a water/alcohol mixture (or water/alcohol/acid mixture) with adjustments in concentrations and conditions, and successfully hydrophobate the silica in a wet or solution process for silica masterbatch.

The present invention provides in one embodiment a process for the preparation of silica masterbatch where solution rubbers and/or emulsion rubbers are mixed with fully hydrophobated silica. The resulting compound has similar properties compared to a dry mix compound, where the silica is hydrophobated typically in a mixer. This wet process can mix one or a few types of solution rubbers with hydrophobated silica aided by other compounding ingredients such as processing oils, during a coagulation process with emulsion rubbers. The resulting masterbatch has a significant amount of solution rubbers typically used in high performance tires, and has fully-dispersed, fully-hydrophobated silica throughout the matrix. This wet process has such a flexibility that some known difficult-to-process solution rubbers, such as high cis BR or solution SBR with very high molecular weight, can be easily incorporated into the system and perform well in rubber compounding. This process also has flexibility for incorporating difficult-to-mix silica, such as silica with a BET surface area of over 175 m2/g, due to the aqueous process conditions.

In one embodiment, precipitated silica is hydrophobated by a silane coupling agent using a reflux method at the boiling point of a solvent. After several hours, the mixture is cooled and a dispersants are added to prevent caking of the hydrophobated silica.

In another embodiment, the hydrophobated silica is mixed with concentrated solution rubber in solvent. Performance enhancers, processing aids, or other additives that are useful to enhance the properties of masterbatch can be added. In another embodiment, these additives can be added after the hydrophobation process but before the stripping/coagulation process.

In one embodiment, granular or micro pearl grades of silica was hydrophobated and stripped/coagulated with solution-made rubber. In this process dispersant and coagulants were both used to control the crumb size, which usually is large enough for regular industrial production. In another embodiment, silica is milled first and then hydrophobated and then stripped/coagulated together with solution-made rubber. Due to the smaller size, an excessive amount of coagulants are used to create crumbs large enough for typical industrial production.

In another embodiment of the present invention, solution rubber crumbs are mixed with an emulsion rubber latex and later coagulated to form a masterbatch of silica, solution rubber and emulsion rubber at desired ratios of each component. In another embodiment, the wet solution rubber masterbatch crumbs can also be fed directly into the drying process together with the emulsion made rubber masterbatch crumbs at desired ratio to obtain dried masterbatches.

In another embodiment, a solution rubber solution is mixed with cationic, anionic, or non-ionic emulsifiers and is intensely mixed. The solvent is later removed by vacuum distillation and a stable emulsion latex is formed. This solution rubber latex is mixed with the emulsion rubber latex at a desired ratio and is homogenized. The latex is later coagulated together with hydrophobated silica in water and a masterbatch of solution rubber and emulsion rubber is obtained.

The present invention provides processes for making a silica masterbatch. In one embodiment, the silica is suspended in a solvent, preferably a low boiling point solvent, such as hexane or cyclohexane, which is commonly used to make solution rubber. A desired type of silane is added into the suspension and then the mixture is heated to the boiling temperature of the solvent. Agitation is provide during this reflux period which lasts a couple to a few hours. After this phase is complete, the silica is hydrophobated and the suspension is allowed to cool back to room temperature. A dispersant soluble in the solvent of choice is later added to prevent the silica from clumping together. Other desired ingredients, such as process oil, can be added after the hydrophobation stage, provided there are sufficient agitation to keep all the ingredients suspended.

In another embodiment, a concentrated solution rubber solution is gradually added into the hydrophobated silica solution. The mixture is constantly under agitation and a uniform suspension is achieved. It is important to adjust the solution viscosity of the material to make it processible for the next stage. A surprising find is that a soluble dispersant helps with the suspension and an additional dosage can be added if needed. Other desired ingredients, such as process oil, can also be added in this stage. An increased solution viscosity in this stage will help to suspend the insoluble ingredients.

In one embodiment, the described mixture of solution rubber and silica is stripped and coagulated to form wet crumbs. The typical stripping and coagulation conditions in a solution rubber plant is suitable for this material. For example, the material can be fed into a hot water bath, or the material can be steam stripped. The temperature of the hot water is preferably higher than the boiling point of the solvent of choice, which will evaporate the solvent and leave crumbs that form. In a typical industrial setting, a dispersant is typically used in this stage in order to prevent the crumbs coming together to form very large pieces. It is a surprise that the silica masterbatch made with solution showed the opposite behavior, where the crumbs are typically very small. In addition, a lot of fines are created during the process which quickly become a processing issue. Silica losses were also observed, perhaps due to the difficulties to collect fines. A surprising finding is that inorganic or organic coagulants are very effective to control the crumb size in this stage. With enough coagulants added, the crumb size increases and the processability also increases. The size of the crumb also depends on the size of the silica. Smaller silicas create smaller crumbs, which require more coagulants to smooth out the process.

In another embodiment, solution rubber solution is mixed with suitable emulsifiers and water, and thus is emulsified. The emulsifiers are added gradually and stirred with the solution rubber solution. Afterwards, high-shear mixing is applied to the mixture. The emulsified solution rubber contains both water and solvent at this stage. This latex form then vacuum distilled to remove the organic solvent, and a latex containing only water as the medium is obtained. The obtained latex can be mixed with an emulsion rubber of choice with strong agitation to form a stable latex mixture, which can then mixed with hydrophobated silica, coagulated, washed and baled. Alternatively, the obtained solution-rubber latex can be mixed with hydrophobated silica made in water alone, without emulsion rubber latex, and can be coagulated together with silica to form a silica and solution-rubber-only masterbatch. Process oil or other necessary ingredients can be added at any stage, but are most typically added during the coagulation stage.

Other embodiments and advantages of the present invention will become apparent to those skilled in the art upon a review of the following detailed description of exemplary embodiments of the invention.

DETAILED DESCRIPTION OF THE INVENTION

One embodiment of the present invention provides a method in which silica is mixed with a solvent of choice and a silane of choice. The amount of silica is 20-200 parts, preferably 50-150, more preferably 70-120 parts compared to the solution rubber. The mixture is refluxed for 1-5 hours, preferably 2-4 hours, to allow the hydrophobation of the silica. The solvent is a low boiling solvent typically used in making solution rubbers. Specifically, hexane and cyclohexanes are very suitable for the process. The silanes can be sulfur containing, or non-sulfur containing, depending on the applications or properties of the final product such as a tire compound. The amount of silanes is 1-15%, preferably 5-10%, of the amount of silica by weight, to allow a full saturation of the surface of the silica. The hydrophobated silica provides better rolling resistance and wet traction for tire compounds. Surprisingly, a grade of large silicas, as long as it is a highly dispersible grade, is as efficient as small silicas in the process and thus the final properties. A highly-dispersible grade silica is made porous, and it is known in the industry that the silane molecules are small enough to penetrate the holes and have access to the silanol groups on the silica surface. Once hydrophobated, the silica is more compatible with the solution rubber, even in the stage of preparation for stripping and coagulation, as it is evident that the mixture is more homogeneous and less time is required to disperse with gentle stirring. The solution rubber is preferably prepared at 10-25 wt %, which mimics industrial conditions. It is preferable to add a process oil in this stage. Due to the presence of solvent, process oil can be dissolved in a very short time. The amount of process oil is 10-60 parts, preferably 20-40 parts compared to solution rubber. It was found that the addition of dispersants is important to keep all the components suspended and to provide better dispersion of the silica after the masterbatch is made. During the stripping/coagulation, dispersants, which usually are hydrophobic polymers functionalized by hydrophilic groups, are added and coagulants, such as calcium chloride and magnesium sulfate, are also added. The size of the crumb will depend on the amount of the dispersants and the coagulants, as well as the temperature, agitation speed, and feed rate. It is a surprise finding that, with the presence of silica, dispersants are no longer needed, as the large amount of silica will naturally regulate the crumb size. In fact, the crumb size might be too small for many types of silica, and a surprising finding is that typical amounts of coagulants are not enough to maintain a reasonably large size of the crumbs. Once formed, the crumbs are filtered and washed with water to remove residues are either kept in a wet condition for further steps, or dried as masterbatches of only solution rubber and silica.

The present invention provides in one embodiment a process for making a silica masterbatch in aqueous coagulation of emulsion rubber, processing oil/other additives, and solution rubber silica masterbatch crumbs. The presence of the solution rubber silica masterbatch crumbs are not expected to influence the coagulation process of the emulsion polymer with silica. The mixture is further homogenized and networked during the subsequent steps of washing, filtering, dewatering and baling.

The invention provides in another embodiment a process for making the silica masterbatch containing both emulsion and solution rubber, where both emulsion rubber silica masterbatch and solution rubber silica masterbatch are added together in a desired ratio during the drying process, where the emulsion-rubber silica masterbatch is made by a process described in the Wallen patent U.S. Pat. No. 8,357,733 or in the Hardiman patent U.S. Pat. No. 9,738,776. Due to the small differences in size and density, both crumbs can be mixed at any ratio. Such advantage is not obtainable in conventional methods, due to the incompatibility of the solvent process and the emulsion process, and can meet end users' versatile needs. In the step of hydrophobating silica in water for emulsion rubber, silane is added and the solution is heated so that the silanalization reaction can happen. The silanol groups on the silica surface react with the silane, and this changes the hydrophobicity of the silica, which makes the silica compatible with the rubber. The hydrophobated silica is added to an emulsion latex, typically an emulsion SBR, but can also be other emulsion types such as natural rubber in the latex form. A processing oil is typically added, and the mixture is homogenized by stirring. The homogenized mixture is coagulated, preferably with a calcium salt, forming a rubber crumb.

One embodiment of the invention provides a process for making a solution rubber latex to compatibilize the emulsion rubber latex, which is subsequently coagulated in a uniform manner to obtain a masterbatch of silica in solution and emulsion rubber. It is a known art in the rubber industry that a dissolved rubber in an organic solvent can be emulsified by various kinds of emulsifiers. One example is Kraton® IR latex, which is emulsified from a high cis polyisoprene. There are also many applications in the asphalt industry to use emulsified solution rubber latex for enhancing the properties. In this process, the solution rubber is either dissolved into the selected solvent, or obtained directly from the manufacturer as an intermediate. It is later emulsified by selected emulsifiers. A high-shear mixer is required in the emulsification stage in order to break apart the droplets of the solution. And the higher the shear rate, the smaller the droplets and consequently the latex micelles. The emulsifiers stabilize the solution and form an oil-in-water type of emulsion. At this stage, there is still a large amount of solvent left in the emulsion. The next step is to distill the solvent out. To maintain the stability of the emulsion, it is preferable to distill under vacuum, where the temperature is reduced to an acceptable level. Once the solvent is distilled, the emulsion contains only similar components as an emulsion-made rubber latex. An emulsion made with solution rubber has typically larger micelles compared to a typical latex, due to the limitations of high shear mixing. The obtained latex is able to mix with the regular emulsion latex and coagulate with silica.

Silica

Silica for the present invention can include pyrogenic and precipitated siliceous fillers, although precipitated silicas are preferred. The siliceous fillers preferably employed in this invention are precipitated silicas, such as those obtained by the acidification of a soluble silicate, e.g., sodium silicate. Such silicas might be characterized, for example, by having a BET surface area, as measured by nitrogen gas, in the range of about 40 to about 600 and preferably in the range of from about 50 to about 300 square meters per gram. The BET method for measuring surface area is described in the Journal of the American Chemical Society, volume 60, page 304 (1930). Also important is surface area characterized by CTAB, which more accurately reflects the surface area that a polymer in a compound experiences. Such silicas might have surface areas in the range of from about 40 to about 600 and are preferably in a range of from about 50 to about 300 meters per gram using this test. The CTAB test is described in ASTM D6845-02 (2008). Various commercially available silicas may be used in the practice of this invention. Example silicas include Hi-Sil 190 and 233 from PPG Industries (One PPG Place, Pittsburgh, Pa., 15272 USA); Z1165MP and Z165 GR from Rhodia (Coeur Defense Tour A-37 eme etage, 110 esplanade Charles de Gaulle, Courbevoje 92931, France); and Ultrasil 7000 from Evonik-Degussa (379 Interpace Parkway, Parsippany, N.J. 07054-0677 USA).

Precipitated silicas that are especially suitable as fillers for passenger vehicle tires typically have the following characteristics:

BET surface area of 100-350 $m^2/g$;
CTAB surface area of 100-350 $m^2/g$; and a
Ratio of BET/CTAB of 0.8-1.3.

High-surface-area (HSA) silicas, as defined in this invention, are silicas having a BET surface area of at least 200 $m^2/g$, preferably greater than 220 $m^2/g$. Highly-dispersible grades are highly preferred. Examples are Newsil HD 200MP (BET 200-230, CTAB 195-225, Q&C Company), Newsil HD 250MP (BET 220-270, CTAB 210-265, Q&C Company), Zeosil Premium (BET 215, CTAB 200, Rhodia). High surface area silicas can be more effective for reducing the rolling resistance and improving the wear of a tire compared to the low surface area of conventional or highly-dispersible silicas. They are not typically used for winter tires or snow tires. Typically, high-surface-area silicas have poor processibility in dry mixing, and the processibility becomes progressively worse with higher and higher surface area.

Precipitated silica is manufactured by treating sodium silicate with an acid such as sulfuric acid in a chemical reactor. The resulting crude silica is filtered and washed to remove the sodium sulfate byproduct, forming the wet-cake silica. Conventionally, the wet-cake silica was dried in a spray drier and in a mill polish drier, after which it was packaged and transported for use as a dry particulate matter. The processing of silica after the wet-cake is made is a significant cost factor in making conventional dry silica product. One aspect of the present invention is the use of the wet-cake silica directly, eliminating the expense of drying and packaging the silica. This silica can be isolated prior to drying and compaction and has the advantage of being easier to disperse in the rubber.

Compared to dry mixing silica into rubber, the present invention can utilize the full potential of silica that has a high surface area. In a dry mix, rubber compounds become more and more difficult to process with the increase of surface area of silica and become almost unprocessable for silica with very high surface area. In the wet process, the surface area of the silica does not matter much, and for silicas with very high surface area, the process can proceed normally without significant adjustment. The silica BET surface area can be from 20-400 $m^2/g$, preferably 100-200 $m^2/g$. Synthetic silica via precipitation methods is highly preferred in the process. Other naturally occurring or synthetic silica via other methods can be used for specific applications. Although it is possible to make a masterbatch with unhydrophobated silica using this invention, it is highly desirable to hydrophobate the silica first.

Process for Hydrophobating Silica in Water or in Solution

Silica is hydrophobated to make the inorganic silica compatible with an organic rubber matrix. Hydrophobation is a compatibilization process. A silane is used in the present invention to treat the silica and make it compatible with rubber. The treatment of the silica with a silane should attach the silane to the silica and make the silica more compatible with the rubber, which is the process of hydrophobating the silica, and once attached to the silica, the silane should have properties or a chemical structure that makes it capable of interacting with the cure system of the rubber to bond the rubber to the silica during cure. Trimethoxy silanes are preferred for hydrophobating silica in a process for making emulsion rubber, including methoxy substituted silanes with the structure shown above as Formula 1 and 3-mercaptopropyl trimethoxy silane. Preferred trimethoxy silane compounds include bis-(3-trimethoxysilylpropyl)-disulfide, bis-(3-trimethoxy-silylpropyl)-tetrasulfide and 3-mercaptopropyl trimethoxy silane.

In water, silica is hydrophobated by mixing a trimethoxy silane coupling agent with water, alcohol and a small amount of a weak acid to initially lower the pH of the solution. Silica is mixed into the solution, and the pH is increased. The mixture of water, acid and alcohol preferably contains at least about 75% water by weight. The procedure for hydrophobating silica is a two-step procedure in which: (i) the trimethoxy silane coupling agent is dissolved in a mixture of alcohol, acid and water for promoting hydrolysis of the trimethoxy silane coupling agent for preparing the trimethoxy silane coupling agent for a condensation reaction, which forms a hydrolyzed trimethoxy silane coupling agent solution; and (ii) the hydrolyzed trimethoxy silane coupling agent solution is mixed with silica, and a base is added to increase the pH for promoting the condensation reaction for bonding the trimethoxy silane coupling agent to the silica to form the hydrophobated silica.

For an emulsion-rubber process, a wet-cake silica is preferably hydrophobated before it is added to the rubber-making process. The silica is treated with a silane coupling agent, which is dissolved in an aqueous alcohol solution. In the first step of the process, a methoxy silane coupling agent is dissolved in approximately an equal volume of alcohol with a catalytic amount of a weak acid, preferably acetic acid. Carbonic acid and oxalic acid are also weak acids. A trimethoxy silane is preferably used, and the pH is acidic, but above about 2.5, preferably between about 3 and about 6, more preferably between about 3.5 and about 5.0. A target pH between about 3.5 and about 4.5 may be satisfactory. Secondly, water is slowly added to the solution over a 15-60 minute period to provide a final alcohol/water ratio of no more than about 25% by weight so as to minimize the need to recycle or dispose of the alcohol. Preferably at the end of the water addition, the alcohol content is less than 10% of the solvent system, and more preferably, the alcohol is less than 5% of the solvent system by weight. The amount of weak acid in the solvent system is small, typically less than about 5%, preferably less than 2% by weight, and the amount of alcohol in the mixture of alcohol, acid and water is generally less than 25%, preferably less than 10% and more preferably less than 5% by weight. Weak acids include acetic, carbonic, formic, oxalic, trichloroacetic, hydrofluoric and hydrocyanic acid.

In solution or in a solution-rubber process, the hydrophobation process is relatively straightforward. The silane and the silica are mixed together in a solvent first. Since most of the silanes are readily soluble in typical solvents, there is very little agitation required. The solvent carries the silane to the pores in the silica and finds the silanol groups on the surface. With highly dispersible silica, the silane molecules are small enough to have access to virtually all the silanol groups. Typically silica contains 6-8% moisture, which in this case is facilitating the hydrolysis of the silane on the surface and then the hydrophobation of the silica. By refluxing the solvent, the hydrophobation commences until all the silanol groups are consumed.

A large number of silanes are suitable for the hydrophobation process, although silanes that contain sulfur are highly preferred for their coupling effect with rubber. Examples of preferred silanes are bis-(3-trimethoxysilylpropyl)-disulfide (TMSPD), bis-(3-trimethoxysilylpropyl)-tetrasulfide (TMSPT), 3-mercaptopropyl trimethoxy silane, and their derivatives of ethoxysilanes and chlorosilanes. Although not preferred, other types of silanes, including aliphatic or aromatic silanes, amino silanes, epoxidized silanes, and other functionalized silanes may be used in the process for specific properties. When using different silanes, care should be taken to adjust the sulfur content from different silanes in order to obtain similar cure response in rubber mixing. The typical amount of silane applied is between 3 phr to 12 phr, preferably 5-8 phr in the final compound.

Process for Making Solution Rubber

In a typical solution SBR process, monomers of styrene and butadiene are dissolved in an organic solvent such as cyclohexane or a mixture of hexane isomers. Polymerization is initiated with alkyl lithium initiators, which have the formula R(Li)1-4. Typical R groups are alkyl, cycloalkyl, cycloalkylalkyl, alkylcycloalkyl, aryl and alkylaryl radicals. Randomization agents are typically added to randomize the styrene and butadiene due to different reaction rates. Various ways may be applied to create polymers with defined microstructure. In addition, the polymer may be functionalized at the chain-end or in-chain via in-situ modification or via post-polymerization steps to obtain a material that offers a strong interaction with silica. For high performance tires, it is a desirable to have high molecular weight, high vinyl, and, optionally, functionalized grades in tire building due to their balanced properties in wet traction and rolling resistance.

The present invention provides considerable freedom on choosing and applying different types of solution rubber. In particular, solution SBRs are highly suitable for the process. Examples of SSBRs are low vinyl grades, high vinyl grades, low MW grades, high MW grades, ultra high MW grades, end-chain functionalized grades, in-chain functionalized grades, linear or branched grades, and various combinations of two or several listed traits. Oil-extended or clear grades are both suitable, although clear grades are preferred for inclusion in the emulsion process so that the cost of extender oil at the solution plant is avoided. Polybutadiene rubber that is synthesized via different catalyst systems (neodymium, titanium, cobalt, lithium, nickel) is also suitable for the process. Neodymium polybutadiene is particularly beneficial through this process because many of the grades are considered difficult to mix in a dry-mix process, largely due to its high cis structure. Polyisoprene is also suitable. Desirable properties may be obtainable by adding or replacing part of the solution rubbers with thermoplastic types of elastomers. Examples are SBS block copolymers, SB random copolymers, EPDM, chloroprene, polyurethane and various other thermoplastic elastomers.

Suitable solvents for carrying out the distillations are saturated or unsaturated, aliphatic or aromatic hydrocarbons, chlorinated aliphatic or chlorinated aromatic hydrocarbons, alcohols and ketones. Suitable dispersants in coagulation are polymers with hydrophilic functionalities. Examples are carboxylate polymers, functionalized acrylic polymers, polymers based on fatty acids or rosin acids, synthetic sulfonated polymers, and other polymers with a hydrophilic functionality. Possible coagulants include calcium chloride, ferric chloride, zinc chloride, salts of aluminum such as aluminum sulfate, salts of magnesium such as magnesium sulfate, sulfuric acid, citric acid and isopropanol, as well as other inorganic or organic types of coagulants. See U.S. Pat. No. 5,679,751, issued to Halasa et al., for additional information on a process for making rubber using a solution process.

The anionically polymerized polymers can be made by any suitable method known in the art, such as those described in U.S. Pat. Nos. 3,281,383 and 3,753,936. In these methods the anionically polymerized polymers are made by contacting anionically polymerizable monomers with an organolithium compound as an initiator. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Many anionic polymerization initiators are well known and commercially available. Monofunctional organolithium compounds, such as butyllithium, are examples of commonly used initiators. Specific examples of these initiators include methyllithium, ethyllithium, tert-butyllithium, sec-butyllithium, n-butyllithium, n-decyllithium, isopropyllithium, eicosyllithium, cycloalkyllithium compounds, such as cyclohexyllithium, and aryllithium compounds, such as phenyllithium, naphthllithium, p-toluyllithium, 1,1-diphenylhexyllithium, and the like. Monofunctional organolithium compounds substituted with protected polar functional groups may also be used as initiators for anionic polymerization.

The amount of initiator varies depending upon the desired molecular weight of the anionically polymerized polymer. Number average molecular weights between about 20,000 and 500,000 can be obtained by adding about 0.20 to 5.0 millimoles of the RLi initiator per mole of monomers corrected by the factor 100/(MW of monomer).

Multifunctional organolithium initiators may also be used as initiators to prepare branched and radial copolymers with a desired functionality range of 2 to about 30 anionically polymerized polymers chains per initiator molecule. Multifunctional organolithium initiators are readily prepared by direct addition reaction of a stoichiometric amount of a monofunctional organolithium compound to a polyvinyl compound such as 1,3-diisopropenyl benzene, 1,3,5-triisopropenyl benzene, 1,3-bis(1-phenylethenyl)benzene, 1,3,5-tris(1-phenylethenyl)benzene, 1,3-divinylbenzene, 1,3,5-trivinylbenzene, and the like. Oligomeric polyvinyl compounds may be used to prepared multifunctional organolithium initiators with high functionality. Monofunctional organolithium compounds, such as butyllithium, are examples of commonly used initiators for the above addition reaction. Specific examples of these commonly used initiators include tert-butyllithium, sec-butyllithium, and n-butyllithium. Monofunctional organolithium compounds substituted with protected polar functional groups may also be used to prepare multifunctional organolithium initiators. Multifunctional organolithium compounds may be combined among them and/or with monofunctional organolithium compounds to partially initiate anionic polymerization with the multifunctional organolithium compound. The partial initiation is achieved by controlling the stoichiometric ratio of multifunctional initiator to monofunctional initiator.

Anionic polymerization is typically carried out in inert hydrocarbon solvents at relatively low temperatures under vacuum or an inert atmosphere with highly purified reagents in order to prevent the premature termination of the polymerization reaction. The anionic polymerization reactions may take place in a variety of organic solvents. Examples of suitable solvents include, but are not limited to, pentane, hexane, heptane, octane, cyclopentane, cyclohexane, cycloheptane, benzene, naphthalene, toluene, xylene, methyl ether, methyl ethyl ether, diethyl ether, tetrahydrofuran, acetone, methyl ethyl ketone, and mixtures thereof. Cyclohexane in particular, is well suited for use as the solvent in anionic polymerizations.

The anionic polymerization is normally carried out at temperatures in the range from −100° C. to 150° C., preferably between −75° C. and 75° C. Normally 50 to 90% by weight of a reaction solvent is used to control the viscosity inside the reaction zone, preferably 70 to 85%. Typical residence times for anionic polymerization vary depending on the reaction temperature and initiator level between 0.1 and 5 hours, preferable from 0.2 to 2 hours.

Polar additives that are known in the art and may be used to prepare the anionically polymerized polymers of the present invention are Lewis bases such as ethers, tertiary amines and aminoethers, Group 1a alkali metal alkoxides and Lewis base-substituted alkali metal alkoxides, and combinations thereof, particularly including binary and ternary systems. Specific examples of these suitable ether polar additives include monofunctional, multifunctional and oligomeric alkyl and cyclic ethers such as dimethyl ether, diethyl ether, ethyl methyl ether, ethyl propyl ether, di-n-propyl ether, tetramethyleneoxide (tetrahydrofuran), 1,2-dimethoxyethane, ditetrahydrofurfuryl propane, and the like. Specific examples of these suitable tertiary amine polar additives include monofunctional, multifunctional and oligomeric alkyl and cyclic tertiary amines such as dimethylethyl amine, trimethyl amine, triethyl amine, N,N,N',N'-tetramethyl ethylene diamine (TMEDA), N,N,N',N',N''-pentamethyl diethyl triamine, and the like. Specific examples of suitable aminoethers are bis[2-(N,N-dimethylamino)ethyl] ether, tetrahydrofurfuryl-N,N-dimethylamine, and the like. Specific examples of these suitable Group 1a alkali metal alkoxides (lithium, sodium, potassium, rubidium and cesium salts) include monofunctional, multifunctional and oligomeric alkyl and cyclic metal alkoxides such as sodium tert-butoxide, sodium tert-amylate, sodium mentholate, potassium tert-butoxide, potassium tert-amylate, potassium mentholate, and the like. Specific examples of suitable Lewis base-substituted alkali metal alkoxides are sodium diethylene glycol monoethyl ether, sodium 1,3-bis (dimethylamino)-2-propanolate, sodium 2-[2-(dimethylamino)ethoxy] ethanolate and sodium 2-{[2-(dimethylamino)ethyl]methylamino} ethanolate, and the like.

The amount of the suitable polar additive is in the range of 0.0005 to 50 weight percentage of the total reaction mixture. Preferred concentrations of polar additive or combination of polar additives depend on the type of polar additive or additives, and the desired monomer sequence length distribution, microstructure and properties of the anionically polymerized polymer. The desired properties will, in turn, depend on the intended application of the anionically polymerized polymer.

Suitable conjugated dienes for use in building the anionically polymerized polymers of the present invention include, but are not limited to, 1,3 butadiene, isoprene, 1,3-pentadiene, methylpentadiene, phenylbutadiene, 2,3-dimethyl-1,3-butadiene, 2,4-hexadiene, 1,3-hexadiene, 1,3-cyclohexadiene, 3,4-dimethyl-1,3-hexadiene, 1,3-octadiene, 4,5-diethyl-1,3-octadiene, myrcene, farnesene and the like. Other anionically polymerizable monomers that may be used in the production of the anionically polymerized polymers include, but are not limited to, monovinyl aromatic monomers, such as styrene and styrene derivatives including 3-methylstyrene, α-methyl styrene, p-methyl styrene, α,4-dimethylstyrene, t-butyl styrene, o-chlorostyrene, 2-butenyl naphthalene, 4-t-butoxystyrene, 3-isopropenyl biphenyl, 4-vinylpyridine, 2-vinylpyridine and isopropenyl naphthalene, 4-n-propylstyrene. Functionalized conjugated diene monomers and functionalized monovinyl aromatic monomers that may be used in the production of the anionically polymerized polymers include, but are not limited to, silylated monomers, and the like.

In some embodiments of the methods provided here, the anionically polymerized polymers undergo total or partial coupling to prepare branched and radial anionically polymerized polymers. Partial coupling means that a portion of the total living anionically polymerized polymer chain-ends undergo coupling with coupling agents. The coupling agents desirably couple between 2 and 30 anionically polymerized polymer chains, although coupling agents capable of coupling a greater number of chains may also be employed. Suitable coupling agents for use in the total or partial coupling step include, but are not limited to, tin halides, silicon halides, functionalized tin compounds, functionalized silicon compound such as a silane compound and functionalized oligomeric compounds such as the ones listed in U.S. Pat. No. 7,517,934. Silicon tetrachloride and tin tetrachloride are specific examples of suitable coupling agents, with silicon tetrachloride being particularly well-suited for this application. The partial coupling is achieved by controlling the stoichiometric ratio of coupling agent to living polymer. The partial coupling may provide a polymer blend with desired properties.

Organometallic compounds of different metals from Groups IIa, IIb and IIIa, including magnesium, zinc and aluminum, may be used as polymerization rate modifiers when mixed with alkyllithium initiators. Specific examples of suitable polymerization rate modifiers are dibutyl magnesium, diethyl zinc and triethyl aluminium. The polymerization rate modifiers may be used to control the temperature profile of polymerization. The polymerization rate modifiers contribute to control a polymerization step in either isothermal mode for a pre-established residence time or quasi-adiabatic mode up to a peak temperature.

In some embodiments of the methods provided here, the anionically polymerized polymers are polymerized in batch, programmed-batch and/or semi-batch processes. In additional embodiments of the methods of the present invention, the anionically polymerized polymers may be prepared in continuous and/or semi-continuous mode. The anionic polymerization of the anionically polymerized polymers may take place in situ i.e., in a single reaction zone, or may take place in multiple reaction zones. The former design tends to favor faster reactions while the latter design may be preferred when specially controlled polymerization reactions are desired. In some embodiments, a reaction apparatus having two or more reaction zones (e.g., reaction chambers) may be employed.

As one of skill in the art would recognize, the described synthesis of the anionically polymerized polymers can occur in a reaction setting comprising either a batch, a semi-continuous or a continuous processes operated at temperatures, solvent ratios and stream flow rates necessary to reach the described residence time and stoichiometry conditions.

Suitable solvents for carrying out the distillations are saturated or unsaturated, aliphatic or aromatic hydrocarbons, chlorinated aliphatic or chlorinated aromatic hydrocarbons, alcohols and ketones. Suitable dispersants in coagulation are polymers with hydrophilic functionalities. Examples are carboxylate polymers, functionalized acrylic polymers, polymers based on fatty acids or rosin acids, synthetic sulfonated polymers, and other polymers with a hydrophilic functionality. Suitable coagulants include calcium chloride, aluminum sulfate, magnesium sulfate, as well as other inorganic or organic types of coagulants.

Silane Coupling Agents

A large number of silanes are suitable for the hydrophobation process, although silanes that contain sulfur are highly preferred for their coupling effect with rubber. Various silane coupling agents can be used, such as 3-mercaptopropyl trialkoxy silane, bis-(3-trialkoxysilylpropyl)-disulfide, bis-(3-trialkoxysilylpropyl)-tetrasulfide, bis-(3-triethoxysilylpropyl)-disulfide, bis-(3-triethoxysilylpropyl)-tetrasulfide, 3-mercaptopropyl triethalkoxy silane, 3-mercaptopropyl trimethalkoxy silane, bis-(3-trimethalkoxysilylpropyl)-disulfide, mercaptopropyltriethoxysilane (MPTES), bis-(3-triethoxysilylpropyl)-disulfide (TESPD), bis-(3-trimethalkoxysilylpropyl)-disulfide, mercaptopropyltriethoxysilane (MPTES), bis-(3-triethoxysilylpropyl)-tetrasulfide, bis-(3-trimethalkoxysilylpropyl)-tetrasulfide, 3-mercaptopropyl trimethoxy silane, bis-(3-trimethoxysilylpropyl)-disulfide, bis-(3-trimethoxysilylpropyl)-tetrasulfide and combinations thereof. Examples of preferred silanes are mercaptopropyltriethoxysilane (MPTES), bis-(3-triethoxysilylpropyl)-disulfide (TESPD), bis-(3-trimethoxysilylpropyl)-disulfide (TMSPD), bis-(3-trimethoxysilylpropyl)-tetrasulfide (TMSPT), 3-mercaptopropyl trimethoxy silane, and their derivatives of ethoxysilanes and chlorosilanes. Although not preferred, other types of silanes, including aliphatic or aromatic silanes, amino silanes, epoxidized silanes, and other functionalized silanes may be used in the process for specific properties. When using different silanes, care should be taken to adjust the sulfur content from different silanes in order to obtain similar cure response in rubber mixing. The typical amount of silane applied is between 3 phr to 12 phr, preferably 5-8 phr in the final compound.

Process for Making Emulsified Solution Rubber Latex

In an emulsification process for rubber, particularly polybutadiene, a rubber is dissolved in a hydrocarbon solvent. The rubber used in this embodiment is a polybutadiene polymer obtained from anionic solution polymerization and different variation may be included as those obtained from lithium catalyst as well as catalyst based on neodymium covering low-medium CIS (30 to 45%) to high CIS (about 90%) polybutadienes and molecular weight from 200,00 to 800,000 Daltons.

As for the solvent to be selected, it is preferable to use any solvent that will quickly dissolve the polybutadiene. Aliphatic hydrocarbon solvents and aromatic solvents can be used. These include isopentane, cyclopentane, n-hexane, cyclohexane, isomers and mixtures thereof, xylene, benzene, toluene, etc.

The amount of rubber dissolved in the solvent will depend of the solubility of the polymer in the solvent. In case of cyclohexane the polybutadiene dissolved can reach from 8 to 10% by weight, in case of xylene it can reach from 9 to 15% by weight.

Polybutadiene can be dissolved in the solvent in a stirred tank at room temperature, however slight heat from 25 to 35° C. can help to dissolve the rubber more quickly. Another important variable is the physical presentation of rubber. Tiny strips of polybutadiene can be dissolved faster than big crumbs.

Another variation can be to replace the solvent for TDAE oil and obtain the polybutadiene dissolved in this oil. Polymer concentration can reach from 3 to 6% by weight, faster polymer dissolution can be improved by heating the oil to about 140° C. under high-shear mixing. Again, small strips of polybutadiene strips dissolve more quickly.

Different surfactant solutions can be prepared, including organic acid surfactants, rosin and fatty amine acid. Better performance was obtained with the use of fatty amine acid surfactant Asfier 121 (from KAO group). The surfactant may be used in a concentration of between 0.5 to 4% by weight in water, preferably between 1.5 to 2.5% by weight. Another variable is the use of soft water to avoid pollutants.

Emulsification of a dissolved polymer with an aqueous surfactant solution may be carried out with the combination of low and high shear homogenization that generates a stable oil-in-water emulsion with a particle size after solvent removal of from about 0.5 to about 10 micrometers.

There are three pathways to remove solvent from an obtained latex. The first one is transfer the complete BR latex from the homogenization process to a vacuum pressure distillation process to separate the solvent assuring to keep the emulsion from latex with adequate flow and viscosity and avoiding being near into the breaking point of emulsion. One problem observed with this route is foam formation. Due to this matter, an antifoaming agent can be added (silicon or mineral oil).

A second alternative for solvent removal is transfer the complete BR latex obtained from the homogenization process to a holding tank, where the latex emulsion is held for 5 days, which permits formation of a cream (an emulsion with oversize particles) that rises to the top that can then be separated by decanting.

A third alternative is to replace the solvent with TDAE naphthenic oil, then do a similar homogenization process using a combination of a low-shear and a high-shear mixing process to obtain a BR oil-extended latex. Then transfer the complete lot to a holding tank, where the latex emulsion is held for 5 days permitting the cream formation (emulsion with oversize particles) to rise to the top and then be separated by decanting.

In a first example a rubber solution was prepared by dissolving a high CIS polybutadiene (Mw from 300,000 to 370,000 Daltons) into cyclohexane. This was carried out at a solids content of 9% by weight of polymer. An aqueous surfactant solution was prepared using a fatty amine acid type surfactant (Asfier 121 from KAO group) at a concentration of 2.5% by weight in acid water (pH=2) at 40° C. 100 gram of this aqueous surfactant solution was combined with 202.2 gram of water and 45.7 gram of polybutadiene solvent solution. Subsequently, a stable oil-in-water emulsion was prepared in a process using first low shear mixer at 600 rpm per 20 minutes at room temperature, and an emulsion system formed as a top layer. Then, the emulsion system was transferred to a high shear mixer and mixed at 3000 rpm for 20 minutes, after which the speed was increased to 7000 rpm for 15 minutes. The cyclohexane emulsion was subjected to solvent removal by vacuum pressure distillation. The solvent started to separate at 78° C. The final BR latex had a 12% solids content.

In a second example a rubber solution was prepared by dissolving a high CIS polybutadiene (Mw from 300,000 to 370,000 Daltons) into cyclohexane. This was carried out at a solids content of 9% by weight of polymer. An aqueous surfactant solution was prepared using a fatty amine acid type surfactant (Asfier 121 from KAO group) at a concentration of 2.5% by weight in acid water (pH=2) at 40° C. 100 gram of this aqueous surfactant solution was combined with 202.2 gram of water and 45.7 gram of polybutadiene solvent solution. Subsequently, a stable oil-in-water emulsion was prepared in a process using first low shear mixer at 600 rpm for 20 minutes at room temperature, and an emulsion system freely rose to the top. Then, the emulsion system was transferred to a high shear mixer and mixed at 3000 rpm for 20 minutes, after which the speed increased to 7000 rpm for 15 minutes. The finished latex was transferred to holding tank, where the emulsion was held for 5 days until an upper cream formation was observed. This "cream" was separated by decanting, obtaining a BR latex with 27% solids content.

In a third example a rubber solution was prepared by dissolving a high CIS polybutadiene (Mw from 300,000 to 370,000 Daltons) into TDAE naphthenic oil (Vivatec 500) at 150° C. This was carried out at a solids content of 3% by weight of polymer. An aqueous surfactant solution was prepared using a fatty amine acid type surfactant (Asfier 121 from KAO group) at a concentration of 2.5% by weight in acid water (pH=2) at 40° C. 100 gram of this aqueous surfactant solution was combined with 202.2 gram of water and 45.7 gram of polybutadiene oil solution. Subsequently, a stable oil-in-water emulsion was prepared in a process using first low-shear mixing at 600 rpm for 20 minutes at room temperature, and at room temperature, an emulsion system rose freely to the top. Then, the emulsion system was transferred to a high-shear mixer and mixed at 3000 rpm for 20 minutes, and after the 20 minutes, the speed was increased to 7000 rpm for 15 minutes.

The oil-extended finished latex was transferred to holding tank where the emulsion was held for 5 days until an upper cream formation was observed. This "cream" was separated by decanting, thereby obtaining a BR latex with 6% solids content.

Processes for Making Masterbatches of Silica and Solution Rubber

The present invention provides in one embodiment a process for making a silica masterbatch, which includes the steps of hydrophobating silica; receiving a solution-made rubber in solution; mixing the hydrophobated silica and the solution-made rubber into the polymer solution; stripping and coagulating the polymer solution; and recovering a silica-filled rubber that comprises a mixture of silica and solution-made rubber. The resulting compound has similar properties compared to a dry mix compound, where the silica is hydrophobated typically in a mixer.

In one embodiment, granular or micro pearl grades of silica was hydrophobated and stripped/coagulated with solution-made rubber. In this process dispersant and coagulants were both used to minimize the loss of silica and control the crumb size, which usually is large enough for regular industrial production. In another embodiment, silica is milled first and then hydrophobated and then stripped/coagulated together with solution-made rubber. Due to the smaller crumb size, an excessive a larger amount of coagulants are used to create crumbs large enough for typical industrial production.

Hydrophobating Silica in Solvent Media

One aspect of this invention is the hydrophobation of silica with a silane prior to the mixing/stripping/coagulating of the masterbatch. The silica is preferably hydrophobated by dissolving a silane coupling agent in the same solvent as the solution-made rubber. The silica and the silane are refluxed in a solvent of choice, preferable the same as in the solution-made rubber solution, for a number of hours, optionally in the presence of a hydrolysis-condensation promoter to optimize the hydrophobation reaction time. As silica is porous and contains typically 6% moisture, the silane reacts with the silica and creates a hydrophobic surface which is more compatible with the rubber.

One embodiment of the invention is a hydrophobating step of the process for making a silica masterbatch in which, first a solvent of choice is added to a hydrophobation reactor, second all the required amount of a suitable silane coupling agent or a blend of silane coupling agents is added to the solvent in the hydrophobation reactor. Then, the mixture is vigorously stirred at an agitation speed of at least 250 rpm and rapidly heated to and held at about the boiling point temperature of the solvent of choice, and the system is refluxed for at least 15 min until the mixture becomes homogeneous. Third, a precipitated silica or a precipitated silica blend is added slowly to the reactor to facilitate incorporation and to rapidly homogenize it into the mixture, while keeping the stirring speed and the refluxing temperature for at least one hour so that the silanization reaction can happen. The silanol groups on the silica surface condense with the hydrolyzed silane coupling agent molecules, and this changes the hydrophobicity of the silica, which makes the silica compatible with the rubber. After the hydrophobation of the silica is completed, the concentration of hydrophobated silica in the mixture is preferably at least about 10% by weight. Finally, the mixture is cooled to about 25° C., kept under slow stirring at about 150 rpm, and a suitable dispersant can be added immediately after the hydrophobation reaction is completed to prevent caking of the hydrophobated silica. Suitable hydrolysis-condensation promoters can be added immediately before the addition of the precipitaded silica. Some of the promoters show some dispersant properties and are also useful to prevent caking.

One additional embodiment of the present invention is the hydrophobating step of the process for making a silica masterbatch in which the sequence and order of addition of silicas and silane coupling agents, and optionally silanization promoters, can be adjusted to perform separate batch, programmed batch, semi-batch and/or continuous additions of the total amount of each component in the mixture, so as to control/improve the silanization reaction efficiency and/or facilitate handling of highly-viscous solutions/dispersions. In addition, for difficult-to-mix high surface area silica, the addition of a silanization promoter and the heating of the mixture can begin after complete addition of both silica and silane coupling agent, and/or the hydrophobation reaction conditions (agitation speed, mixing temperature and concentration) can be adjusted to avoid a highly-viscous, gel-like state that prevents good mixing.

Materials used for the hydrophobating step of the process for making a silica masterbatch of the present invention include the following. A variety of solvents can be used for the hydrophobating step, preferably organic solvents such as cyclohexane, hexane, pentane, heptane, toluene, and combinations thereof. Silica for the present invention can include pyrogenic and precipitated siliceous pigments, although precipitated silicas are preferred. Various silane coupling agents can be used, such as 3-mercaptopropyl trialkoxy silane, bis-(3-trialkoxysilylpropyl)-disulfide, bis-(3-trialkoxysilylpropyl)-tetrasulfide, bis-(3-triethoxysilylpropyl)-disulfide, bis-(3-triethoxysilylpropyl)-tetrasulfide, 3-mercaptopropyl triethalkoxy silane, 3-mercaptopropyl trimethalkoxy silane, bis-(3-trimethalkoxysilylpropyl)-disulfide, mercaptopropyltriethoxysilane (MPTES), bis-(3-triethoxysilylpropyl)-disulfide (TESPD), bis-(3-trimethalkoxysilylpropyl)-tetrasulfide, 3-mercaptopropyl trimethoxy silane, bis-(3-trimethoxysilylpropyl)-disulfide, bis-(3-trimethoxysilylpropyl)-tetrasulfide and combinations thereof. Hydrolysis-condensation promoters such as Lewis bases and acids can be used as desired.

Mixing Hydrophobated Silica with Solution Rubber

The present invention provides in one embodiment a process for the preparation of silica masterbatch using a solution process where solution rubbers and hydrophobated silicas are mixed optionally in the presence of a suitable dispersant or a blend of dispersing agents. The solution-made rubber is preferably received in the form of rubber in a solvent of choice. This wet process can mix one or a few types of solution rubbers with hydrophobated silica aided by other compounding ingredients such as processing oils. The resulting masterbatch has fully-dispersed, fully-hydrophobated silica throughout the matrix, has silica bound to the rubber through the silane coupling agent and functionalized rubber backbone chain by silane coupling agent moieties, and no residual hydrolysis reaction by-product. This wet process has such a flexibility that some known difficult-to-process solution rubbers, such as BR with very high molecular weight, can be easily incorporated into the system and perform well in rubber compounding. This wet process also has flexibility for incorporating difficult-to-mix silica, such as silica with a BET surface area of over 175 m2/g.

The rubber to silica ratio will typically be greater than 0.3/1.0 and will preferably be between 10/1 and 1/1 and more preferably between 4.0/1.0 and 1.25/1.0. The amount of silica in the final compound where the masterbatch is used can vary widely. In some embodiments, the total silica is between about 20 and about 200 parts, preferably between about 50 and about 150 parts, per 100 parts of rubber. For tire compounds, the silica content may vary between 10 parts per hundred rubber and 90 parts per hundred rubber.

Another embodiment of the invention is a mixing step of the process for making a silica masterbatch, comprising: adding the solution-made rubber received in the form of rubber in a solvent of choice to a mixing reactor, wherein the concentration of the rubber solution is at least about 10% by weight; heating to a temperature of at least about 25° C. and stirring vigorously at relatively high speed of at least about 650 rpm; optionally adding a processing aid slowly into the mixing reactor to facilitate incorporation into the rubber solution; keeping the stirring speed for about one hour until the mixture becomes homogeneous; adding a hydrophobated silica mixture previously prepared in a solvent of choice, preferably the same solvent of the solution-made rubber, slowly to the mixing reactor to facilitate incorporation; adding a suitable dispersant or a blend of dispersant agents into the mixing reactor, wherein the dispersant is used to improve the dispersion and/or avoid clumping of the silica in the mixture; keeping the stirring speed for at least two hours to allow the mixture to become homogeneous, thereby forming a hydrophobated-silica solution-rubber masterbatch. The concentration of the hydrophobated-silica solution-rubber masterbatch is preferably at least about 10% by weight.

One additional embodiment of the present invention is the mixing step of the process for making a silica masterbatch in which, the sequence and order of addition of rubber solution and hydrophobated silica, and optionally processing aids and dispersing agents, can be adjusted to perform separate batch, programmed batch, semi-batch and/or continuous additions of the total amount of each component in the mixture, so as to facilitate/improve the incorporation of the components in the mixture in order to obtain a fully-dispersed, fully-hydrophobated silica throughout the matrix, and/or facilitate handling of highly-viscous solutions/dispersions, and/or avoid a highly-viscous, gel-like state that prevents good mixing.

In one embodiment, performance enhancers, processing aids, or other additives that are useful to enhance the properties of masterbatch can be added during the stripping/coagulation steps. In another embodiment, these additives can be added after the hydrophobation process but before the stripping/coagulation process.

Another aspect of this invention is to have the hydrophobated silica mixed with a rubber solution that can be obtained directly from a solution rubber plant at solids level from 5-50%, preferably 10-20%. The hydrophobated silica is mixed with the rubber solution and a suitable dispersant is used to keep the silica from clumping together. The suitable dispersant or dispersing agents blend can be added before, during or after the mixing step.

Materials used for the mixing step of the process for making a silica masterbatch of the present invention include the following. Preferred solution rubbers are conjugated diene homopolymers (BR, IR), conjugated diene and monovinyl aromatic random copolymers (SBR, SIR) and terpolymers (SIBR), binary or ternary mixtures such as SBR/Nd-BR, SBR/Li-BR, SBR1/SBR2, SBR1/SBR2/Nd-BR, functionalized versions of these solution rubbers (F-BR, F-SBR), and combinations thereof. Particularly preferred is a combination of solution rubbers F-SBR and F-BR. Dispersing agents can be anionic, cationic, not ionic, multifunctional, and combinations thereof, preferred dispersants are ethylene oxide/propylene oxide copolymers, phosphate esters, lactylates, etc. and combinations thereof. Preferred processing aids are TDAE oil, NAPH oil, etc. and combinations thereof.

Stripping/Coagulating Silica Masterbatch with Solution Rubber

Another aspect of this invention is the stripping/coagulating step of the hydrophobated-silica solution-rubber masterbatch prior to the recovery of the final product. In the stripping/coagulating step of the hydrophobated-silica solution-rubber masterbatch, suitable dispersants and coagulants are used in the steam/water to control the crumb size, and perhaps more importantly, to minimize the loss of silica and the formation of fines in the stripping/coagulating serum. Crumb size should be large enough to facilitate drying during the recovery step for regular industrial production. The type of dispersion and coagulation agents to be used for the stripping/coagulating step depends on the specific solution rubber, and the hydrophilic and hydrophobic characteristics of the specific agents. The size of the crumb will depend on the amount of the dispersants and the coagulants, as well as the temperature, agitation speed, and feed rate.

One embodiment of the invention is a stripping/coagulating step of the process for making a silica masterbatch, comprising: adding demineralized water to a stripping/coagulating reactor; adding small amounts of dispersants and/or coagulants to form a stripping/coagulating serum, wherein the concentration of each dispersant and/or coagulant is preferably less than 1% by weight, wherein the pH of the stripping/coagulating serum is from about 4 to about 10 and preferably the pH is from about 6 to about 8 and more preferably the pH is from about 7 to about 8; heating the serum to and holding to a temperature of about 90° C.; stirring at an agitation speed of at least about 300 rpm; adding a hydrophobated-silica solution-rubber masterbatch slowly into the stripping/coagulating reactor, wherein the feed rate allows to control crumb size and facilitate complete solvent separation, wherein the stirring speed and serum temperature are maintained until the stripping/coagulating step is completed, thereby obtaining wet crumbs of the hydrophobated-silica solution-rubber masterbatch. The concentration of hydrophobated-silica solution-rubber masterbatch solids in stripping/coagulating serum is from about 5 to about 25% by weight, preferably from about 5% to about 15% by weight.

One additional embodiment of the present invention is the stripping/coagulating step of the process for making a silica masterbatch in which the sequence and order of addition of hydrophobated-silica solution-rubber masterbatch and dispersants/coagulants, and optionally demineralized water, can be adjusted to perform separate batch, programmed batch, semi-batch and/or continuous additions of the total amount of each component in the mixture, and continuous removal/withdrawal of the crumb serum so as to obtain the hydrophobated-silica solution-rubber masterbatch by a continuous stripping/coagulating process.

In another embodiment, concentrated solution rubber in solvent with hydrophobated silica is steam-distilled, forming a rubber crumb in water. The size of the rubber crumbs is controlled typically by the addition of dispersants and/or coagulants used in a typical industrial process. The wet masterbatch crumb is dewatered and washed to remove dispersants and/or coagulants and then dried.

Materials used for the stripping/coagulating step of the process for making a silica masterbatch of the present invention include the following. Dispersing and coagulating agents can be anionic, cationic, not ionic, multifunctional, and combinations thereof. Preferred dispersants are ethylene oxide/propylene oxide copolymers, phosphate esters, lactylates, etc. and combinations thereof.

Recovering Silica Masterbatch with Solution Rubber

One embodiment of the invention is a recovery step of the process for making a silica masterbatch, comprising: dewatering the hydrophobated-silica solution-rubber masterbatch crumb serum; washing the crumbs with fresh demineralized water to separate excess dispersants and coagulants; drying the washed crumbs at a temperature of about 85° C. for about 4 hours and/or until the residual volatile matter is at most about 2% by weight, thereby obtaining the final silica masterbatch with solution rubber product.

In an additional embodiment of the present invention, the hydrophobation reaction of a silica with a silane coupling agent is performed during a mixing step, or a stripping/coagulating step, or a recovery step of a modified process for making a silica masterbatch. The sequence and order of addition of a solvent of choice, a precipitated silica, a silane coupling agent, a silanization promoter, a solution-rubber, a processing aid, and dispersants/coagulants, can be adjusted to perform the silanization during other steps of the modified process at different conditions. Treated, modified and/or functionalized silicas can be used as an alternative to the hydrophobating step of the process or in combination with precipitated silicas to improve the performance of the silica masterbatch with solution rubber.

Another aspect of the present invention is that the solution-rubber silica masterbatch can be added into emulsion rubber. This process comprises the steps of: (a) operating an emulsion-rubber plant; (b) receiving a silica-solution-rubber masterbatch described herein that contains silica and solution-made rubber, but does not contain emulsion-made rubber; (c) making a polymer latex; (d) mixing the silica-solution-rubber masterbatch into the polymer latex; (e) coagulating the polymer latex from step (d); and (f) recovering a silica masterbatch that comprises a mixture of silica, solution-made rubber and emulsion-made rubber. Silica, preferably hydrophobated silica, can also be mixed into the polymer latex before coagulating the latex.

EXAMPLES

Example 1

Preparation of silica masterbatch with high vinyl, medium styrene, solution styrene-butadiene rubber (SSBR).

A. Preparation of hydrophobated silica slurry.

A hydrocarbon solution of silane was prepared by charging to a 4L hydrophobation reactor 1368 g of cyclohexane followed by 12.8 g of Si266 silane coupling agent (bis[3-(triethoxysilyl)propyl]disulfide). The amount of silane coupling agent should be adjusted and calculated based on the molar ratio to satisfy the requirements of total sulfur content in the final tire compound. Alternatively, sulfur-protected silanes and/or sulfur-free silanes may be used or combined to adjust properties, and it is also possible to prepare a silica slurry without silane coupling agent. Then, the mixture was vigorously stirred at an agitation speed of 350 rpm, and rapidly heated to between 60-80° C., and held at about 70° C., close to the boiling point temperature of the solvent of choice, and the system was refluxed for 15 min, until the mixture became homogeneous. After this period of time, 160 g of Zeosil 1165MP precipitated silica were charged slowly to the hydrophobation reactor to facilitate incorporation and to rapidly homogenize the silica into the mixture, and the stirring speed and the refluxing temperature were kept for 4 hours, so that the silanization reaction occurred. After the hydrophobation of the silica was completed, the concentration of hydrophobated silica in the mixture was about 10% by weight. Finally, the mixture was cooled and kept under slow stirring at about 200 rpm until room temperature was reached, between 20-25° C. Alternatively, any complex ester of phosphoric acid and ethoxylated cetostearyl alcohol and/or suitable phosphate ester blends may be added immediately after the hydrophobation of the silica is completed to prevent caking of the hydrophobated silica. It may be possible to use a high surface area silica such as a Newsil HD 250MP grade (BET 250 m2/g) instead of Zeosil 1165MP grade.

B. Preparation of silica masterbatch with solution rubber.

In a separate 4 L reactor equipped with a high-shear stirrer, 1970 g of a cyclohexane solution of SSBR (Solprene® 7101 solution prior to oil addition), received directly from the polymerization reactor, was charged to the mixing reactor, wherein the concentration of the rubber solution was about 10% by weight; stirred vigorously at relatively high speed of about 600 rpm and kept at room temperature; then 60 g of Vivatec 500 processing oil was slowly charged into the mixing reactor to facilitate incorporation into the rubber solution; followed by the addition of 12.5 mL of a 2% by weight aqueous solution of Crodafos CS2A to improve the dispersion and/or avoid clumping of the silica in the mixture; and the stirring speed was kept for about 1 hour until the mixture became homogeneous. Then, the hydrophobated silica slurry mixture previously described in A was slowly added to the mixing reactor to facilitate incorporation; the stirring was kept for 2 hours to allow the mixture to become homogeneous, thereby forming a hydrophobated-silica solution-rubber masterbatch cyclohexane mixture at about 6% by weight. The concentration of the masterbatch cyclohexane mixture is preferably at least about 5% by weight, and more preferably at least about 10% by weight. The masterbatch cyclohexane mixture was then dosed at a feed rate of about 27.9 g/min to a 3 L stripping/coagulating reactor containing 2.5 L of demineralized water, 31.25 mL of Nalco 8103 and 50 mL of magnesium sulfate at about 2% by weight in water, to form a stripping/coagulating serum. The masterbatch cyclohexane mixture is slowly added into the stripping/coagulating reactor, wherein the feed rate allows to control crumb size and facilitate complete solvent separation. The concentration of each dispersant and/or coagulant is preferably less than 1% by weight. Alternatively, a stream of dispersants and coagulants (50-200 ppm of each components, preferably 100-200 ppm) water solution can be fed into the reactor gradually. The pH of the stripping/coagulating serum is from about 4 to about 10 and preferably the pH is from about 6 to about 8 and more preferably the pH is from about 7 to about 8. The serum was heated to between 85-95° C. and held to a temperature of about 90° C., and stirred at an agitation speed of about 250-350 rpm prior to initiate the dosification of the masterbatch cyclohexane mixture, cyclohexane was instantly distilled off together with water (92:8 weight ratio), thereby forming wet crumbs of the hydrophobated-silica solution-rubber masterbatch in serum. The concentration of masterbatch solids in stripping/coagulating serum is from about 5 to about 25% by weight, preferably is from about 5% to about 15% by weight. The total amount of solids collected from an experimental batch was close to be 400 grams, a yield close to 100%. The final size of the crumbs was around 0.5-1.5 mm in diameter under a microscope. The size was strongly influenced by the feed rate, the agitation speed and the serum temperature. The feed rate in a laboratory setting is preferred to be lower than 50 grams per minute to better accommodate the limited temperature control capacity for lab equipment. The agitation speed is preferred to be higher than 200 RPM and lower than 400 RPM. A mixing baffle is highly preferred for better controlling the size of the crumb. Finally, the crumbs were dewatered by filtering the serum and washed with fresh demineralized water to separate excess dispersants and coagulants. The wet crumbs were dried at a temperature of about 85° C. for about 4 hours and/or until the residual volatile matter was at most about 2% by weight, thereby obtaining the final silica masterbatch prepared with solution rubber product.

C. Compounding with masterbatch.

140 g of silica masterbatch was mixed in a Brabender internal mixer. Temperature in the chamber was set at 50° C., and the drop temperature was 160° C. The composition of the silica masterbatch is given in Table 1. The amount of silica used is shown on a dry-weight basis. In Table 2, the amount of curatives used for the indicated amount of silica masterbatch is listed. The curatives were added in the mixer, and the resulting compound was rolled into a cylinder on the mill. The cylinder was turned 90° and fed back through the mill nip. The cylinder was put through the mill 5 times to complete the mixing.

TABLE 1

Recipe of the silica masterbatch described in Example 1.

| Masterbatch, phr | SMB |
|---|---|
| SSBR | 100.00 |
| Zeosil 1165MP | 80.00 |

TABLE 1-continued

Recipe of the silica masterbatch described in Example 1.

| Masterbatch, phr | SMB |
|---|---|
| TDAE oil | 30.00 |
| Silane Si266 | 6.40 |
| AO | 1.00 |
| Total | 217.40 |

TABLE 2

Compounding recipe of the masterbatch and a dry-mix compound.

| Compound, phr | SMB | Dry-mix |
|---|---|---|
| SMB | 152.11 | |
| Solprene ® 7101 | | 96.25 |
| CB 24 | 30.00 | 30.00 |
| Zeosil 1165MP | 24.00 | 80.00 |
| TDAE oil | 16.50 | 11.25 |
| TMQ | 1.00 | 1.00 |
| 6PPD | 1.50 | 1.50 |
| Zinc Oxide | 3.00 | 3.00 |
| Stearic acid | 2.00 | 2.00 |
| Si 266 | 1.92 | 6.40 |

TABLE 3

Compounding results of the silica masterbatch vs. a dry-mix compound.

| Parameter | SMB | Dry-mix |
|---|---|---|
| Tensile, MPa | 19.2 | 17.4 |
| Elongation, % | 458.0 | 459.0 |
| 100% Modulus, MPa | 1.9 | 1.9 |
| 300% Modulus, MPa | 9.9 | 9.0 |
| Durometer, Shore A | 61.0 | 61.0 |
| Tear, Die C, PPI | 225.0 | 212.0 |
| Pendulum rebound, % | 41.0 | 39.0 |
| DIN, mm3 loss | 77.0 | 90.0 |
| DMA | | |
| Tan Delta @ 0° C. (Wet traction) | 0.467 | 0.417 |
| Tan Delta @ 60° C. (Rolling resistance) | 0.088 | 0.102 |
| Tan Delta @ 75° C. (Rolling resistance) | 0.077 | 0.092 |

The compound properties illustrated in Table 3 for the SMB compound, such as physical and dynamic properties, are comparable or better than the dry-mix compound. Wet traction and rolling resistance via DMA were observed to be better in SMB, which may be attributed to the better dispersion of silica in the compound.

Example 2

Preparation of silica masterbatch with low vinyl, high styrene, solution styrene-butadiene rubber (SSBR).
A. Preparation of hydrophobated silica slurry.
Ultrasil 7000 silica was selected and air-milled to an average particle size of about 5 μm. The air-milled Ultrasil 7000 silica was used instead of the Zeosil 1165MP. The air-milled silica and the Si69 silane coupling agent (bis[3-(triethoxysilyl)propyl]tetrasulfide) were added directly into the mixing reactor and the hydrophobation reaction occurred during the stripping/coagulation process step.
B. Preparation of silica masterbatch with solution rubber.
Preparation of silica materbatch with solution rubber follows the procedure described in Example 1 with the modifications described in A. A low vinyl, high styrene, solution styrene-butadiene rubber (SSBR: Solprene® 7201 solution prior to oil addition) was used.
C. Compounding with masterbatch.
Compounding with masterbatch follows the procedure described in Example 1.

TABLE 4

Recipe of the silica masterbatch described in Example 2.

| Masterbatch, phr | SMB |
|---|---|
| SSBR | 100.00 |
| Ultrasil 7000 | 100.00 |
| TDAE oil | 30.00 |
| Silane Si69 | 8.00 |
| AO | 0.85 |
| Total | 238.85 |

TABLE 5

Compounding recipe of the masterbatch.

| Compound, phr | SMB | Dry-mix |
|---|---|---|
| SMB | 238.85 | |
| Solprene ® 7201 | | 138.35 |
| CB 24 | | |
| Ultrasil 7000 | | 100.00 |
| TDAE oil | 7.5 | |
| TMQ | 1.00 | 1.00 |
| 6PPD | 1.50 | 1.50 |
| Zinc Oxide | 3.00 | 3.00 |
| Stearic acid | 2.00 | 2.00 |
| Si 69 | | 8.00 |

TABLE 6

Compounding results of the silica masterbatch vs. a dry-mix compound.

| Parameter | SMB | Dry-mix |
|---|---|---|
| Tensile, MPa | 20.8 | 20.1 |
| Elongation, % | 518.0 | 462.0 |
| 100% Modulus, MPa | 2.1 | 2.2 |
| 300% Modulus, Mpa | 9.4 | 10.9 |
| Durometer, Shore A | 75.0 | 70.0 |
| Tear, Die C, PPI | 245.7 | 265.6 |
| Pendulum rebound, % | | |
| DIN, mm3 loss | | |
| DMA | | |
| Tan Delta @ 0° C. (Wet traction) | 0.589 | 0.653 |
| Tan Delta @ 60° C. (Rolling resistance) | 0.140 | 0.144 |
| Tan Delta @ 75° C. (Rolling resistance) | | |

Example 3

Preparation of silica masterbatch with low vinyl, solution polybutadiene rubber (Li-BR).
A. Preparation of hydrophobated silica slurry.
Preparation of hydrophobated silica slurry follows the procedure described in Example 1 with modifications. Ultrasil 7000 silica was selected and air-milled to an average particle size of about 5 μm. The air-milled Ultrasil 7000 silica was used instead of the Zeosil 1165MP. The silane coupling agent KBM-3033 (n-propyltrimethoxysilane) was used instead of the Si266.

B. Preparation of silica masterbatch with solution rubber.

Preparation of silica materbatch with solution rubber follows the procedure described in Example 1 with modifications. A low vinyl, solution polybutadiene rubber (Li-BR) was used. The stripping/coagulation process step was performed in the presence of the dispersing agent system Tamol 731A (30 mL at 2% by weight in water) and calcium chloride (75 mL at 2% by weight in water).

C. Compounding with masterbatch.

Compounding with masterbatch follows the procedure described in Example 1.

TABLE 7

Recipe of the silica masterbatch described in Example 3.

| Masterbatch, phr | SMB |
|---|---|
| Li-BR | 100.00 |
| Ultrasil 7000 | 80.00 |
| TDAE oil | 30.00 |
| KBM-3033 | 6.40 |
| AO | 1.00 |
| Total | 217.40 |

TABLE 8

Compounding recipe of the masterbatch.

| Compound, phr | SMB | Dry-mix |
|---|---|---|
| SMB | 65.22 | |
| Solprene ® 7101 | 96.25 | 96.25 |
| Solprene ® Li-BR | | 30.00 |
| Ultrasil 7000 | 56.00 | 80.00 |
| TDAE oil | 2.25 | 11.25 |
| TMQ | 1.00 | 1.00 |
| 6PPD | 1.50 | 1.50 |
| Zinc Oxide | 3.00 | 3.00 |
| Stearic acid | 2.00 | 2.00 |
| KBM-3033 | 4.48 | 6.40 |

Example 4

Preparation of silica masterbatch with Neodymium, high cis, solution polybutadiene rubber (Nd-BR).

A. Preparation of hydrophobated silica slurry.

Preparation of hydrophobated silica slurry follows the procedure described in Example 1 with modifications. Powder grade Ultrasil 7000 silica was selected and used instead of the Zeosil 1165MP. The Ultrasil 7000 silica and the Si266 silane coupling agent were added directly into the mixing reactor and the hydrophobation reaction occurred during the mixing process step.

B. Preparation of silica masterbatch with solution rubber.

Preparation of silica materbatch with solution rubber follows the procedure in Example 1 with modifications. A Neodymium, high cis, solution polybutadiene rubber (Nd-BR) was used. First, the Nd-BR (Buna CB24 grade) was dissolved in cyclohexane by high-shear stirring between 650-800 rpm at room temperature for about 4 hours, thereby forming a cyclohexane solution of Nd-BR (csBR). As previously described in A, the Ultrasil 7000 silica and the Si266 silane coupling agent were then added to the mixing reactor and stirred between 300-350 rpm at about 60-70° C. for about 4 hours. Then, while the mixture was cooled down to room temperature, TDAE process oil and CS2A dispersing agent were charged directly into the mixing reactor vessel and stirred for about 2 hours prior to the steam distillation. The stripping/coagulation process step was performed in the presence of the dispersing agent system Tamol 731A (30 mL at 2% by weight in water) and calcium chloride (75 mL at 2% by weight in water).

C. In addition, a second silica masterbatch was prepared with anionically emulsified Nd-BR (Buna CB24 grade). The anionically emulsified rubber was prepared by first dissolving Nd-BR at about 15% by weight of polymer into cyclohexane at room temperature. An aqueous surfactant solution was prepared using a fatty acids acid type surfactant (Oleic acid in KOH) at a concentration of about 2.5% by weight. Then, 100 g of this aqueous surfactant solution was combined with 100 g of the polybutadiene in cyclohexane solution. Subsequently, a stable oil-in-water emulsion was prepared in a 2-step process: using first low-shear mixing at 600 rpm for 20 minutes at room temperature, after which an emulsion system freely rose to the top. Then, the emulsion system was transferred and mixed with a high-shear mixer at 3000 rpm for 20 minutes, finally the speed was increased to 7000 rpm for 15 minutes. After emulsification stage was finished, cyclohexane solvent was removed through a simple distillation process. The final latex was transferred to a holding tank where the emulsion was held for 5 days until an upper cream formation was observed. This "cream" was separated by decanting, thereby obtaining a BR latex with 15% by weight solids content. This anionically emulsified BR (aeBR) was used to prepare a silica masterbatch by mixing with hydrophobated Ultrasil 7000 silica, TDAE oil and Si266 silane coupling agent in water as described in previous examples.

D. Alternatively, a silica masterbatch may be prepared with cationically emulsified Nd-BR (Buna CB24 grade). The cationically emulsified rubber was prepared by first dissolving Nd-BR at about 9% by weight of polymer into cyclohexane at room temperature. An aqueous surfactant solution was prepared using a fatty amine acid type surfactant (Asfier 121 from KAO group) at a concentration of about 2.5% by weight in acid water (pH=2) at 40° C. Then, 100 g of this aqueous surfactant solution was combined with 202.2 g of water and 45.7 g of polybutadiene oil solution. Subsequently, a stable oil-in-water emulsion was prepared in a 2-step process: using first low-shear mixing at 600 rpm for 20 minutes at room temperature, after which an emulsion system freely rose to the top. Then, the emulsion system was transferred and mixed with a high-shear mixer at 3000 rpm for 20 minutes, finally the speed was increased to 7000 rpm for 15 minutes. The final latex was transferred to a holding tank where the emulsion was held for 5 days until an upper cream formation was observed. This "cream" was separated by decanting, thereby obtaining a BR latex with 27% by weight solids content. This cationically emulsified BR (ceBR) may be used to prepare a silica masterbatch by mixing with hydrophobated Ultrasil 7000 silica, TDAE oil and Si266 silane coupling agent in water as described in previous examples.

E. Compounding with masterbatch.

Compounding with masterbatch follows the procedure in Example 1.

TABLE 9

Recipe of the silica masterbatches described in Example 4.

| Masterbatch, phr | SMB csBR | SMB aeBR |
|---|---|---|
| Nd-BR | 100.00 | 100.00 |
| Ultrasil 7000 | 100.00 | 60.00 |
| TDAE oil | 30.00 | 10.00 |
| Si266 | 8.00 | 3.90 |
| AO | 1.00 | 0.40 |
| Total | 239.00 | 174.30 |

TABLE 10

Compounding recipe of the masterbatch.

| Compound, phr | SMB csBR | SMB aeBR | Dry-mix |
|---|---|---|---|
| SMB | 71.70 | 52.29 | |
| Solprene ® 7101 | 96.25 | 96.25 | 96.25 |
| CB 24 | | | 30.00 |
| Ultrasil 7000 | 50.00 | 62.00 | 80.00 |
| TDAE oil | 2.25 | 8.25 | 11.25 |
| TMQ | 1.00 | 1.00 | 1.00 |
| 6PPD | 1.50 | 1.50 | 1.50 |
| Zinc Oxide | 3.00 | 3.00 | 3.00 |
| Stearic acid | 2.00 | 2.00 | 2.00 |
| Si266 | 4.00 | 4.96 | 6.40 |

TABLE 11

Compounding results of the silica masterbatch vs. a dry-mix compound.

| Parameter | SMB csBR | SMB aeBR | Dry-mix |
|---|---|---|---|
| Tensile, MPa | 20.5 | 15.3 | 16.1 |
| Elongation, % | 513.2 | 405.5 | 426.7 |
| 100% Modulus, MPa | 2.1 | 2.1 | 2.2 |
| 300% Modulus, Mpa | 9.5 | 9.9 | 9.5 |
| Durometer, Shore A | 65 | 66 | 69 |
| Tear, Die C, PPI | 226.4 | 222.6 | 233.3 |
| Pendulum rebound, % | 41 | 38 | 39 |
| DIN, mm3 loss | 96 | 112 | 94 |
| DMA | | | |
| Tan Delta @ 0° C. (WT) | 0.380 | 0.466 | 0.371 |
| Tan Delta @ 60° C. (RR) | 0.098 | 0.093 | 0.101 |
| Tan Delta @ 75° C. (RR) | 0.088 | 0.083 | 0.090 |

Example 5 (Hypothetical)

Combination of silica masterbatch with high vinyl, medium styrene, solution styrene-butadiene rubber (SSBR) and silica masterbatch with Neodymium, high cis, solution polybutadiene rubber (Nd-BR).

A. The silica masterbatch with high vinyl, medium styrene, solution styrene-butadiene rubber (SSBR) would be prepared according to the procedure in Example 1 with modifications. Powder grade Ultrasil 7000 silica would be used instead of the Zeosil 1165MP.

B. The silica masterbatch with Neodymium, high cis, solution polybutadiene rubber (Nd-BR) would be prepared according to the procedure described in Example 4 with modifications. Powder grade Ultrasil 7000 silica would be used instead of the Zeosil 1165MP.

Alternatively, a silica masterbatch with SSBR/Nd-BR blend could be prepared by first dissolving both SSBR and Nd-BR in cyclohexane prior to mixing with the hydrophobated silica slurry.

C. Compounding with masterbatch.

Compounding with masterbatch would follow the procedure described in Example 1 with modifications. The combination would be compounded in the Banbury mixer.

TABLE 12

Recipe of the silica masterbatches described in Example 5.

| Masterbatch, phr | SMB SSBR | SMB Nd-BR |
|---|---|---|
| SSBR or Nd-BR | 100.00 | 100.00 |
| Ultrasil 7000 | 80.00 | 80.00 |
| TDAE oil | 30.00 | 30.00 |
| Silane Si266 | 6.40 | 6.40 |
| AO | 1.00 | 1.00 |
| Total | 217.40 | 217.40 |

TABLE 13

Compounding recipe of the masterbatches and a dry-mix compound.

| Compound, phr | SMB SSBR/Nd-BR | Dry-mix |
|---|---|---|
| SMB SSBR | 152.18 | |
| SMB Nd-BR | 65.22 | |
| Solprene ® 7101 | | 96.25 |
| CB 24 | | 30.00 |
| Ultrasil 7000 | | 80.00 |
| TDAE oil | 7.50 | 11.25 |
| TMQ | 1.00 | 1.00 |
| 6PPD | 1.50 | 1.50 |
| Zinc Oxide | 3.00 | 3.00 |
| Stearic acid | 2.00 | 2.00 |
| Si 266 | | 6.40 |

TABLE 14

Compounding results of the silica masterbatches combination vs. a dry-mix compound.

| Parameter | SMB SSBR/Nd-BR | Dry-mix |
|---|---|---|
| Tensile, MPa | 15.3 | 18.5 |
| Elongation, % | 385.0 | 461.5 |
| 100% Modulus, MPa | 2.0 | 1.9 |
| 300% Modulus, MPa | 10.5 | 9.5 |
| Durometer, Shore A | 61 | 63 |
| Tear, Die C, PPI | 188.0 | 198.8 |
| Pendulum rebound, % | 35 | 34 |
| DIN, mm3 loss | 54 | 61 |
| DMA | | |
| Tan Delta @ 0° C. (WT) | 0.485 | 0.448 |
| Tan Delta @ 60° C. (RR) | 0.089 | 0.094 |
| Tan Delta @ 75° C. (RR) | 0.083 | 0.088 |

Example 6 (Hypothetical or Prophetic)

Combination of silica masterbatch with high vinyl, medium styrene, solution styrene-butadiene rubber (SSBR) and silica masterbatch with low vinyl, medium styrene, emulsion styrene-butadiene rubber (ESBR).

A. The silica masterbatch with high vinyl, medium styrene, solution styrene-butadiene rubber (SSBR) would be prepared according to the procedure in Example 1 with modifications. Powder grade Ultrasil 7000 silica would be used instead of the Zeosil 1165MP.

B. The silica masterbatch with low vinyl, medium styrene, emulsion styrene-butadiene rubber (ESBR) would be prepared according to the procedure in previous examples with modifications. Powder grade Ultrasil 7000 silica would be used.

C. Alternatively, a silica masterbatch with SSBR/ESBR blend could be prepared by first dissolving both SSBR and ESBR in cyclohexane prior to mixing with the hydrophobated silica slurry.

D. Compounding with masterbatch.

Compounding with masterbatch would follow the procedure described in Example 1 with modifications. The combination would be compounded in the Banbury mixer.

TABLE 15

Recipe of the silica masterbatches described in Example 6.

| Masterbatch, phr | SMB SSBR | SMB ESBR |
|---|---|---|
| SSBR or ESBR | 100.00 | 100.00 |
| Ultrasil 7000 | 80.0 | 60.00 |
| TDAE oil | 30.00 | 30.00 |
| Silane Si266 or A189 | 6.40 | 3.90 |
| AO | 1.00 | 0.40 |
| Total | 217.40 | 194.30 |

TABLE 16

Compounding recipe of the masterbatches and a dry-mix compound.

| Compound, phr | SMB SSBR/ESBR | Dry-mix |
|---|---|---|
| SMB SSBR | 86.96 | |
| SMB ESBR | 38.86 | |
| Solprene ® 7101 | | 55.00 |
| E1723 | | 27.50 |
| CB 24 | 40.00 | 40.00 |
| Ultrasil 7000 | 36.00 | 80.00 |
| N234 | 10.00 | 10.00 |
| TDAE oil | 12.50 | 8.00 |
| TMQ | 1.80 | 1.80 |
| 6PPD | 2.20 | 2.20 |
| Zinc Oxide | 2.50 | 2.50 |
| Stearic acid | 1.25 | 1.25 |
| Si 69 | 2.88 | 6.40 |

TABLE 17

Compounding results of the silica masterbatches combination vs. a dry-mix compound.

| Parameter | SMB SSBR/ESBR | Dry-mix |
|---|---|---|
| Tensile, MPa | 17.1 | 19.1 |
| Elongation, % | 459.0 | 490.0 |
| 100% Modulus, MPa | 2.0 | 2.0 |
| 300% Modulus, MPa | 9.5 | 9.3 |
| Durometer, Shore A | 63 | 65 |
| Tear, Die C, PPI | 250.4 | 243.3 |
| Pendulum rebound, % | 36 | 38 |
| DIN, mm3 loss | 74 | 73 |
| DMA | | |
| Tan Delta @ 0° C. (WT) | 0.244 | 0.238 |
| Tan Delta @ 60° C. (RR) | 0.116 | 0.131 |

Example 7

Preparation of silica masterbatch with high vinyl, medium styrene, functionalized solution styrene-butadiene rubber (F-SSBR).

A. Preparation of hydrophobated silica slurry.

Preparation of hydrophobated silica slurry follows the procedure described in Example 1 with modifications. Huber silica was selected and air-milled to an average particle size of about 5 μm. The air-milled Huber silica was used instead of the Zeosil 1165MP. The silane was first hydrolyzed by charging to a vessel 64 g of isopropanol, 16 g of Si266, and 1.6 g of acetic acid. The mixture was then stirred vigorously at room temperature while 16 g of water was slowly added. The mixture was heated to about 50° C. and then stirred between 120-200 rpm for about 20 min until the solution cleared. Then, 52.5 g of water was slowly added and the mixture was stirred between 120-200 rpm for about 90 min until the solution cleared. Finally, 60.6 g of water was slowly added and the mixture was stirred between 120-200 rpm for about 10 min until the solution cleared. Alternatively, ethanol and/or the silane coupling agents A189 and Si69 may be used with adjusted conditions to achieve similar results. The amount of silane coupling agent should be adjusted and calculated based on the molar ratio to satisfy the requirements of total sulfur content in the final tire compound. Alternatively, sulfur-protected silanes and/or sulfur-free silanes may be used or combined to adjust properties, and it is also possible to prepare a silica slurry without silane coupling agent. As one of the most commonly used weak acids, acetic acid is preferred for adjusting the pH value to be preferably about 3 to about 5. It may be possible to use a high surface area silica such as a Newsil HD 250MP grade (BET 250 m2/g) instead of Zeosil 1165MP grade.

In a hydrophobation reactor 4 L vessel equipped with a stirrer, 1658 g of cyclohexane and 200 g of silica were charged. The mixture was then stirred between 300-350 rpm and refluxed by heating to between 70-75° C. for at least 30 min to ensure the silica was completely dispersed. Then, the aqueous silane solution previously prepared was added while stirring. Immediately after, the pH of the mixture was increased to about 7.5 by adding 3.96 g of a 25% NaOH solution. The mixture was then heated to approximately 70° C. for 2 hours while continuously mixing to complete the hydrophobation reaction. 12.5 mL of a 2% by weight aqueous solution of Crodafos CS2A was slowly added during the hydrophobation reaction to improve the dispersion and/or avoid clumping of the silica in the mixture. Finally, the mixture was cooled and kept under slow stirring at about 200 rpm until a temperature of about 50° C. was reached.

B. Preparation of silica masterbatch with solution rubber.

Preparation of silica materbatch with solution rubber follows the procedure described in Example 1 with modifications. In a 4 L mixing reactor vessel equipped with a stirrer, 1800 g de F-SSBR solution was charged along with 60 grams of TDAE oil and stirred at about 600 rpm and room temperature for about 1 hour until the mixture became homogeneous. Then, the hot hydrophobated silica slurry prepared in A was slowly added to the F-SSBR/Oil mixture and stirred between 600-800 rpm for about 2 hours, thereby forming the silica masterbatch cyclohexane mixture. This mixture was then stripped/coagulated and dried to obtain the silica masterbatch product.

C. Alternatively, a silica masterbatch with F-SSBR/Nd-BR blend may be prepared by first dissolving both F-SSBR and Nd-BR in cyclohexane prior to mixing with the hydrophobated silica slurry. It may also be possible to combine a silica masterbatch prepared with F-SSBR and a silica masterbatch prepared with Nd-BR.

D. Compounding with masterbatch.

Compounding with masterbatch follows the procedure described in Example 1.

TABLE 18

Recipe of the silica masterbatch described in Example 7.

| Masterbatch, phr | SMB |
|---|---|
| F-SSBR | 100.00 |
| Huber | 100.00 |
| TDAE oil | 30.00 |
| Silane Si266 | 8.00 |
| AO | 1.00 |
| Total | 239.00 |

TABLE 19

Compounding recipe of the masterbatch and a dry-mix compound.

| Compound, phr | SMB | Dry-mix |
|---|---|---|
| SMB | 167.30 | |
| Solprene ® 7302 | | 70.00 |
| CB 24 | 30.00 | 30.00 |
| Ultrasil 7000 | 10.00 | 80.00 |
| TDAE oil | 16.50 | 37.50 |
| TMQ | 1.00 | 1.00 |
| 6PPD | 1.50 | 1.50 |
| Zinc Oxide | 3.00 | 3.00 |
| Stearic acid | 2.00 | 2.00 |
| Si 266 | 0.80 | 6.40 |

Example 8

Preparation of silica masterbatch with low vinyl, functionalized solution polybutadiene rubber (F-BR).

A. Preparation of hydrophobated silica slurry.

Preparation of hydrophobated silica slurry follows the procedure described in Example 7.

B. Preparation of silica masterbatch with solution rubber.

Preparation of silica materbatch with solution rubber follows the procedure described in Example 7 with modifications. A low vinyl, functionalized solution polybutadiene rubber (F-BR) was used. The stripping/coagulation process step was performed in the presence of the dispersing agent system Tamol 731A (30 mL at 2% by weight in water) and calcium chloride (75 mL at 2% by weight in water).

C. Alternatively, silica masterbatches with SSBR/F-BR or F-SSBR/F-BR blends may be prepared by first dissolving either SSBR or F-SSBR with F-BR in cyclohexane prior to mixing with the hydrophobated silica slurry. It may also be possible to combine a silica masterbatch prepared with either SSBR or F-SSBR with a silica masterbatch prepared with F-BR.

D. Compounding with masterbatch.

Compounding with masterbatch follows the procedure described in Example 1. SMB Nd-BR was prepared in Example 4.

TABLE 20

Recipe of the silica masterbatch described in Example 8.

| Masterbatch, phr | SMB F-BR |
|---|---|
| F-BR | 100.00 |
| Huber | 100.00 |
| TDAE oil | 30.00 |
| Si266 | 8.00 |
| AO | 1.00 |
| Total | 239.00 |

TABLE 21

Compounding recipe of the masterbatch.

| Compound, phr | SMB F-BR | SMB Nd-BR |
|---|---|---|
| SMB | 71.70 | 71.70 |
| Solprene ® 7101 | 96.25 | 96.25 |
| Ultrasil 7000 | 50.00 | 50.00 |
| TDAE oil | 2.25 | 2.25 |
| TMQ | 1.00 | 1.00 |
| 6PPD | 1.50 | 1.50 |
| Zinc Oxide | 3.00 | 3.00 |
| Stearic acid | 2.00 | 2.00 |
| Si266 | 4.00 | 4.00 |

TABLE 22

Compounding results of the silica masterbatch vs. a dry-mix compound.

| Parameter | SMB F-BR | SMB Nd-BR |
|---|---|---|
| Tensile, MPa | 12.5 | 20.5 |
| Elongation, % | 328.6 | 513.2 |
| 100% Modulus, MPa | 2.5 | 2.1 |
| 300% Modulus, Mpa | 11.2 | 9.5 |
| Durometer, Shore A | 66 | 65 |
| Tear, Die C, PPI | 181.0 | 226.4 |
| Pendulum rebound, % | 33 | 41 |
| DIN, mm3 loss | | |
| DMA | | |
| Tan Delta @ 0° C. (WT) | 0.709 | 0.380 |
| Tan Delta @ 60° C. (RR) | 0.104 | 0.098 |
| Tan Delta @ 75° C. (RR) | 0.093 | 0.088 |

Process for Making Rubber Products

A silica masterbatch produced at a rubber plant according to the present invention can be used to make a variety of rubber products, such as belts, conveyor belts, drive belts, printing rolls, printing roller, a roller wheel, track tread, flooring tile, flooring sheets, friction blocks, hoses, tubing, sheets, gaskets, hose covers, cable sheaths, shoe soles, heels for shoes, parts for vehicles including automobiles, trucks and off-road vehicles, but it is anticipated that the greatest use of the silica masterbatch will be in the tire-manufacturing industry. The silica masterbatch can be used in making tires generally and more particularly in making tire tread, tire sidewall, tire shoulder, tire bead and tire apex. The silica masterbatch will significantly improve the tire-manufacturing process.

The tire-manufacturing process can be divided into five general areas, as outlined by James Mark and Burak Erman, Science and Technology of Rubber, 3rd ed., pp 655-661. These areas are 1) rubber mixing, 2) calendaring, 3) extrusion, 4) tire building and 5) curing. The mixing area is generally described in U.S. Pat. No. 5,711,904, which is incorporated by reference. Here polymers, fillers, oils and waxes are blended in a mixer to provide a "non-productive" mix which is then blended with curatives and mixed at a lower temperature to provide a "productive" mix, which is used in downstream processes. The second unit of the tire plant is the calendaring area and is generally described in U.S. Pat. No. 4,126,720, which is incorporated by reference. The productive-mix rubber is deposited on either fabric or steel cord in such a manner that all of the fabric or cord is coated with rubber. Rubber is placed on the calendar rolls in such a manner so that it is sheeted, and the fiber or wire is embedded into the sheet. Material coming off the calendar is cut to length and width for the tire building machine. The third area of the tire plant is extrusion, where components such as tread, apex and sidewall are processed. As with the mixing area, the extrusion process is described in U.S. Pat. No. 5,711,904. Rubber from the mixing area is put through either a "cold feed" or "hot feed" extruder with a die on the end. The rubber is pushed through the die which is cut such that the rubber being extruded has the necessary dimensions to be put on the tire building machine. The fourth area of the tire plant is the tire building area, where all of the components from previous operations, including the extruded parts, calendared plies, belts and beads, are assembled on building machines to provide a "green tire." This process is outlined in more detail in U.S. Pat. No. 4,402,782, which is incorporated by reference. The fifth area of the tire manufacturing process is the vulcanization of the green tire to provide the final product. The vulcanization process is outlined in U.S. Pat. No. 5,240,669, which is incorporated by reference. The green tire is placed into a mold, and is pressed into the shape of the mold with a heated rubber bladder which is pressurized with steam or hot water. The bladder keeps the green tire at elevated temperature for sufficient time to ensure complete curing of the tire, after which the tire is released to quality control.

The present invention further provides a process for making a tire, which includes receiving a silica masterbatch made according to the present invention; making a nonproductive compound with the silica masterbatch and preferably another rubber; mixing curatives with the nonproductive compound to make a final compound; making tire components such as tread and/or sidewall with the final compound; assembling the tire components into a green tire; and vulcanizing the green tire to make a finished tire. Other rubber products can be made in a similar manner.

Embodiments of the Invention

Embodiment 1. A process for making a masterbatch of silica and solution-made rubber, comprising the steps of:

adding a silane coupling agent, a first organic solvent and silica into a hydrophobation reactor;

mixing and heating the contents of the hydrophobation reactor for a period of time, thereby forming a hydrophobated silica slurry;

mixing a solution-made rubber with a second organic solvent in a mixing reactor;

adding the hydrophobated silica slurry into the mixing reactor and mixing the contents of the mixing reactor, thereby forming a silica-and-rubber mixture that comprises the hydrophobated silica, the solution-made rubber and the first and second organic solvents;

adding water and a coagulating agent to a stripping/coagulating reactor;

adding the silica-and-rubber mixture to the stripping/coagulating reactor;

heating the stripping/coagulating reactor, thereby forming a silica-and-rubber crumb in a serum; and separating the silica-and-rubber crumb from the serum, preferably further comprising washing and recovering the silica-and-rubber crumb as the masterbatch of silica and solution-made rubber.

Embodiment 2. The process of Embodiment 1, wherein the silane coupling agent has properties and/or a chemical structure that allows the silane coupling agent to attach to the silica and bond directly or indirectly to a rubber during curing for coupling the silica to the rubber.

Embodiment 3. The process of Embodiment 1 or 2, wherein the silane coupling agent is selected from the group consisting of: 3-mercaptopropyl trialkoxy silane, bis-(3-trialkoxysilylpropyl)-disulfide, bis-(3-trialkoxysilylpropyl)-tetrasulfide, bis-(3-triethoxysilylpropyl)-disulfide, bis-(3-triethoxysilylpropyl)-tetrasulfide, 3-mercaptopropyl triethalkoxy silane, 3-mercaptopropyl trimethalkoxy silane, bis-(3-trimethalkoxysilylpropyl)-disulfide, mercaptopropyl-triethoxysilane (MPTES), bis-(3-triethoxysilylpropyl)-disulfide (TESPD), bis-(3-trimethalkoxysilylpropyl)-disulfide, mercaptopropyltriethoxysilane (MPTES), bis-(3-triethoxysilylpropyl)-tetrasulfide, bis-(3-trimethalkoxysilylpropyl)-tetrasulfide, 3-mercaptopropyl trimethoxy silane, bis-(3-trimethoxysilylpropyl)-disulfide (TMSPD), bis-(3-trimethoxysilylpropyl)-tetrasulfide (TMSPT), ethoxysilane and chlorosilane derivatives of methoxysilanes and combinations thereof.

Embodiment 4. The process of Embodiment 1, 2 or 3, wherein the solution-made rubber is selected from the group consisting of conjugated diene homopolymers (BR, IR), conjugated diene and monovinyl aromatic random copolymers (SBR, SIR) and terpolymers (SIBR), binary or ternary mixtures such as SBR/Nd-BR, SBR/Li-BR, SBR1/SBR2, SBR1/SBR2/Nd-BR, functionalized versions of these solution rubbers (F-BR, F-SBR), and combinations thereof.

Embodiment 5. The process of Embodiment 1, 2, 3 or 4, wherein the dispersing agent is anionic, cationic, not ionic, multifunctional, or a combination thereof.

Embodiment 6. The process of Embodiment 1, 2, 3 or 4, wherein the dispersing agent is an ethylene oxide/propylene oxide copolymer, a phosphate ester, a lactylate or a combination thereof.

Embodiment 7. The process of any one of Embodiments 1 to 6, wherein the second organic solvent is the same as the first organic solvent.

Embodiment 8. The process of any one of Embodiments 1 to 7, further comprising adding a process oil and a dispersant into the mixing reactor.

Embodiment 9. A process for making a masterbatch of silica and solution-made rubber, comprising the steps of:

mixing and heating a silane coupling agent, a solvent and silica in a hydrophobation reactor to hydrophobate the silica and form a hydrophobated silica stream that contains between 5% and 25% silica by weight;

mixing a process oil and a dispersing agent into a combination of a solution-made rubber and solvent in a vessel, wherein the concentration of solution-made rubber in the combination of a solution-made rubber and solvent is between 5% and 25% by weight;

adding the hydrophobated silica stream into the vessel;

mixing the contents of the vessel for a period of time;

adding water, a coagulating agent and a dispersant to a stripping/coagulating reactor;

adding the vessel contents into the stripping/coagulating reactor;

heating the stripping/coagulating reactor and distilling off some or all water and some or all of the solvent, thereby forming wet crumbs of a silica-filled rubber in a stripping/coagulating serum, wherein the silica-filled rubber comprises solution-made rubber and hydrophobated silica;

separating the wet crumbs from the stripping/coagulating serum;

washing the wet crumbs;

drying the wet crumbs; and recovering a material that comprises the solution-made rubber and the hydrophobated silica, wherein the hydrophobated silica is mixed homogeneously throughout the solution-made rubber.

Embodiment 10. A process for making a masterbatch of silica and solution-made rubber, comprising the steps of:

mixing a silane coupling agent with an organic or hydrocarbon solvent, preferably hexane or cyclohexane, in a hydrophobation reactor, preferably heating the mixture to nearly the boiling point of the solvent, preferably stirring the mixture for 5 minutes to an hour and more preferably about 15 min., wherein the silane coupling agent is preferably (bis[3-(triethoxysilyl)propyl]disulfide);

adding silica to the hydrophobation reactor, preferably stirring the mixture for more than an hour and less than 8 hours, more preferably stirring for about 4 hours, preferably at slightly less than the boiling point of the solvent, preferably under a reflux temperature condition, thereby hydrophobating the silica and forming a hydrophobated silica slurry, wherein preferably the concentration of hydrophobated silica in the hydrophobated silica slurry is between 5% and 25% and is more preferably about 10% by weight, wherein preferably the hydrophobated silica slurry is allowed to cool to ambient temperature, preferably to between 20 and 25° C., wherein preferably a complex ester of phosphoric acid and ethoxylated cetostearyl alcohol and/or a suitable phosphate ester blend is added to the hydrophobated silica slurry to prevent caking of the hydrophobated silica;

adding a solution-made rubber and a solvent, preferably a non-polar, organic solvent, preferably cyclohexane, to a mixing reactor, wherein preferably the concentration of rubber in the rubber and solvent mixture is between 5 and 25 weight percent, typically between 5 and 15 wt % and preferably 10 wt %, preferably mixing the rubber and solvent mixture, preferably at ambient or room temperature; preferably adding process oil to the mixing reactor and mixing it into the rubber and solvent mixture; preferably adding a dispersing agent to the mixing reactor, wherein the dispersing agent is preferably soluble in the solvent in the mixing reactor;

adding the hydrophobated silica slurry into the mixing reactor, wherein the contents of the mixing reactor is preferably mixed for between 0.5 and 4 hours, preferably 1.5 to 2.5 hours, and more preferably 2 hours, thereby forming a mixture that comprises hydrophobated silica, solution-made rubber and organic solvent, wherein the mixture contains typically 2% to 15%, preferably 5% to 10% hydrophobated silica and solution-made rubber;

adding water and a coagulating agent to a stripping/coagulating reactor, wherein preferably a dispersant is added to the stripping/coagulating reactor, wherein preferably the coagulating agent is magnesium sulfate, typically 1 to 5 wt %, preferably 2 wt % magnesium sulfate in water, wherein optionally the concentration of each of the dispersant and the coagulant is less than 1% by weight, wherein optionally a stream of dispersants and coagulants in water (typically 50-200 ppm, preferably 100-200 ppm, of each component) can be fed into the stripping/coagulating reactor, preferably gradually;

adding the mixture that comprises hydrophobated silica, solution-made rubber and organic solvent to the stripping/coagulating reactor, thereby forming a stripping/coagulating serum;

heating the stripping/coagulating reactor and distilling off water and some or all of the organic solvent, thereby forming wet crumbs of a solution-made rubber in a stripping/coagulating serum, wherein the solution-made rubber contains hydrophobated silica mixed into the rubber, wherein the stripping/coagulating reactor is preferably heated to a temperature equal to or greater than the boiling point of the solvent, wherein the stripping/coagulating reactor is preferably heated to 85 to 95° C. and is preferably held at a temperature of about 90° C., wherein the pH of the stripping/coagulating serum is typically from about 4 to about 10 and preferably the pH is from about 6 to about 8 and more preferably the pH is from about 7 to about 8, wherein the solids content in the stripping/coagulating serum is typically from about 5 to about 25% by weight and is preferably from about 5% to about 15% by weight, wherein the size of the crumb particles is typically less than about 3 mm, preferably less than 2 mm, and are generally 0.5 to 1.5 mm in diameter, wherein a dispersant is preferably added into the stripping/coagulating reactor for preventing crumb particles from agglomerating, wherein a coagulant is preferably added into the stripping/coagulating reactor for controlling the size of crumb particles; preferably separating the crumb particles from the stripping/coagulating serum, preferably by filtering, and preferably washing the crumb particles with water to remove excess dispersants and coagulants; preferably drying the crumb particles, preferably at a temperature of about 85° C., preferably for about 4 hours, and preferably until residual volatile matter in the crumb particles is no more than 2% by weight; and recovering a solution-made rubber crumb that contains hydrophobated silica mixed homogeneously throughout the rubber crumb, wherein preferably there is no emulsion-made rubber in the solution-made rubber crumb.

Embodiment 11. A process for making a masterbatch of silica and solution-made rubber, comprising the steps of:

mixing a silane coupling agent, preferably (bis[3-(triethoxysilyl)propyl]disulfide), with an alcohol, preferably isopropanol, and with a weak acid, preferably acetic acid, in a hydrophobation reactor, preferably in amounts to provide approximately 78 wt % alcohol, 20 wt % silane coupling agent and 2 wt % weak acid;

adding water slowly to the hydrophobation reactor to hydrolyze the silane coupling agent and make an aqueous silane solution, preferably an amount in a first addition approximately equal in weight to the amount of silane coupling agent, preferably an amount in a second addition equal in weight to about 80% of the amount of alcohol, preferably the second addition being enough for the for the solution to become clear rather than cloudy, and preferably a third addition equal in weight to approximately the amount of the alcohol, the additions preferably being made while stirring, preferably over a period of about an hour or two, wherein, alternatively, the alcohol can be ethanol, and the silane coupling agent can be a combination of A189 (mercaptopropyl trimethoxysilane) and Si69 (bis[3-(triethoxysilyl)propyl]tetrasulfide), wherein, alternatively, a sulfur-protected silane and/or a sulfur-free silane can be used, wherein preferably the weak acid maintains the pH between about 3 and about 5;

mixing an organic solvent, preferably hexane or cyclohexane, with silica in a second hydrophobation reactor while heating the mixture;

adding the aqueous silane solution into the second hydrophobation reactor;

adding, preferably, a base, preferably a sodium hydroxide solution, to the second hydrophobation reactor to increase the pH, preferably to between 7 and 8, more preferably to about 7.5, preferably maintaining the second hydrophobation reactor at about 70° C. for about 2 hours, preferably adding a dispersant and allowing the contents of the second hydrophobation reactor to cool, preferably down to about 50° C., preferably while stirring;

adding a solution-made rubber, preferably a high vinyl, medium styrene, functionalized solution styrene-butadiene rubber (F-SSBR), and a process oil, preferably TDAE oil, a solvent, preferably a non-polar, organic solvent, preferably cyclohexane, to a mixing reactor, wherein preferably the concentration of rubber in the rubber and solvent mixture is between 5 and 25 weight percent, typically between 5 and 15 wt % and preferably 10 wt %, preferably mixing the rubber and solvent mixture, preferably at ambient or room temperature, wherein, alternatively, a blend of F-SSBR and Nd-BR can be mixed with an organic solvent, preferably cyclohexane, prior to mixing with the hydrophobated silica slurry; preferably adding process oil to the mixing reactor and mixing it into the rubber and solvent mixture; preferably adding a dispersing agent to the mixing reactor, wherein the dispersing agent is preferably soluble in the solvent in the mixing reactor;

adding the hydrophobated silica slurry into the mixing reactor, wherein the contents of the mixing reactor is preferably mixed for between 0.5 and 4 hours, preferably 1.5 to 2.5 hours, and more preferably 2 hours, thereby forming a mixture that comprises hydrophobated silica, solution-made rubber and organic solvent, wherein the mixture contains typically 2% to 15%, preferably 5% to 10% hydrophobated silica and solution-made rubber;

adding water and a coagulating agent to a stripping/coagulating reactor, wherein preferably a dispersant is added to the stripping/coagulating reactor, wherein preferably the coagulating agent is magnesium sulfate, typically 1 to 5 wt %, preferably 2 wt % magnesium sulfate in water, wherein optionally the concentration of each of the dispersant and the coagulant is less than 1% by weight, wherein optionally a stream of dispersants and coagulants in water (typically 50-200 ppm, preferably 100-200 ppm, of each component) can be fed into the stripping/coagulating reactor, preferably gradually;

adding the mixture that comprises hydrophobated silica, solution-made rubber and organic solvent to the stripping/coagulating reactor, thereby forming a stripping/coagulating serum;

heating the stripping/coagulating reactor and distilling off water and some or all of the organic solvent, thereby forming wet crumbs of a solution-made rubber in a stripping/coagulating serum, wherein the solution-made rubber contains hydrophobated silica mixed into the rubber, wherein the stripping/coagulating reactor is preferably heated to a temperature equal to or greater than the boiling point of the solvent, wherein the stripping/coagulating reactor is preferably heated to 85 to 95° C. and is preferably held at a temperature of about 90° C., wherein the pH of the stripping/coagulating serum is typically from about 4 to about 10 and preferably the pH is from about 6 to about 8 and more preferably the pH is from about 7 to about 8, wherein the solids content in the stripping/coagulating serum is typically from about 5 to about 25% by weight and is preferably from about 5% to about 15% by weight, wherein the size of the crumb particles is typically less than about 3 mm, preferably less than 2 mm, and are generally 0.5 to 1.5 mm in diameter, wherein a dispersant is preferably added into the stripping/coagulating reactor for preventing crumb particles from agglomerating, wherein a coagulant is preferably added into the stripping/coagulating reactor for controlling the size of crumb particles; preferably separating the crumb particles from the stripping/coagulating serum, preferably by filtering, and preferably washing the crumb particles with water to remove excess dispersants and coagulants; preferably drying the crumb particles, preferably at a temperature of about 85° C., preferably for about 4 hours, and preferably until residual volatile matter in the crumb particles is no more than 2% by weight; and recovering a solution-made rubber crumb that contains hydrophobated silica mixed homogeneously throughout the rubber crumb, wherein preferably there is no emulsion-made rubber in the solution-made rubber crumb.

Embodiment 12. The process of embodiment 11, wherein the solution-made rubber is a low vinyl, functionalized solution polybutadiene rubber (F-BR).

Embodiment 13. The process of embodiment 12, wherein the stripping/coagulation process step was performed in the presence of the dispersing agent system Tamol 731A (30 mL at 2% by weight in water) and calcium chloride (75 mL at 2% by weight in water).

Embodiment 14. The process of embodiment 11, wherein the solution-made rubber is a blend of at least two of SSBR, F-BR, F-SSBR, wherein the blend is first dissolved in a solvent, preferably cyclohexane.

What is claimed is:

1. A process for making a silica masterbatch, comprising the steps of:
   (a) mixing silica, a nonpolar organic solvent and a silane coupling agent together in a vessel;
   (b) refluxing the solvent to hydrophobate the silica and/or heating the silica, solvent and silane coupling agent;
   (c) adding a dispersant to the vessel after or during step (b);
   (d) adding a solution-rubber solution and process oil to the vessel to form a mixture;
   (e) steam stripping and coagulating the mixture formed in step (d), thereby making a silica-filled rubber crumb; and
   (f) recovering the silica-filled rubber crumb,
   wherein the silane coupling agent has properties or a chemical structure capable of interacting with a cure system for rubber to bond the rubber to the silica during cure, and
   wherein the silane coupling agent is selected from the group consisting of:
a trialkoxy silane coupling agent, 3-mercaptopropyl trialkoxy silane, bis-(3-trialkoxysilylpropyl)-disulfide, bis-(3-trialkoxysilylpropyl)-tetrasulfide and a trialkoxy silane represented by the formula:

$$[(RO)_3 \text{Si-}(Alk)_m\text{-}(Ar)_p]_q[B],$$

where
B is —SCN, R—C(=O)S, if q=1 or $S_x$ if q=2;
Alk is a straight chained or branched bivalent hydrocarbon radical;
R is an alkyl group containing 1 to 18 carbons;
m is 0 or 1;
p is 0 or 1;
m+p=1;
q is 1 or 2;
Ar is an arylene radical having from 6 to 12 carbon atoms; and
x is a number from 2 to 8.

2. The process of claim 1, wherein the silica has a BET surface area of between about 200 and about 400 m²/g.

3. The process of claim 1, wherein the solution-rubber solution is made from a polymer selected from the group consisting of styrene-butadiene rubber, natural rubber, neoprene rubber, acrylonitrile butadiene rubber, polybutadiene rubber, EPDM, chloroprene, HNBR, SBS, vinyl pyridine butadiene rubber, styrene butadiene termonomer rubber and functionalized and/or hydrogenated versions of the foregoing polymers, and wherein the termonomer is selected from the group consisting of hydroxyalkyl acrylate, vinyl pyridine and acrylonitrile.

4. The process of claim 1, wherein the process further comprises adding a coagulant to the mixture.

5. The process of claim 4, wherein the amount of the coagulant in the mixture is less than 1 wt % for controlling the size of the crumb and for preventing a loss of silica as fines.

6. The process of claim 5, wherein the process further comprises adding to the mixture one or more ingredients selected from the group consisting of carbon black, talc, clay, 6-PPD stabilizer, antidegradants, zinc salts, waxes, resins, and crosslinking chemicals.

7. The process of claim 5, wherein the process further comprises dewatering, drying and forming the silica-filled rubber crumb into a congealed bale, wherein carbon black is not required in the process for making the silica-filled rubber crumb or for forming the silica-filled rubber crumb into the congealed bale, and wherein carbon black is an optional additive.

8. The process of claim 5, wherein particles of the silica-filled rubber crumb have a diameter of at least about 0.5 mm.

9. The process of claim 8, wherein the solution rubber in the silica-filled rubber crumb comprises from about 10 to about 80 parts of a total of 100 parts of all rubber in the silica-filled rubber crumb.

10. The process of claim 9, wherein the silica-filled rubber crumb contains between about 15 and about 50 parts of process oil per 100 parts of rubber.

11. The process of claim 10, wherein the process oil is selected from the group consisting of highly aromatic oil, aromatic oil (AO), treated distillate aromatic extract (TDAE), residual aromatic extract (RAE), mildly extracted solvate (MES), naphthenic oil, hydroprocessed naphthenic oil (HNO) and paraffinic oil.

12. The process of claim 1, wherein the process further comprises obtaining a solution-made rubber in the form of dry particles; dissolving the dry particles in an organic solvent to yield the solution-rubber solution, wherein the solution-rubber solution contains from about 10 to about 35 wt % solution-made rubber; adding a dispersant and a coagulant to the mixture; and steam distilling the mixture.

13. The process of claim 1, wherein the process further comprises using a steam distillation unit as the vessel and adding a dispersant and/or a coagulant into the steam distillation unit, wherein the steam distillation unit comprises a distillation column having an upper end and a lower end, wherein the lower end includes a reservoir for holding a liquid, wherein the liquid or the reservoir is heated, wherein the solution rubber solution and process oil is fed into the upper end of the distillation column, wherein the nonpolar organic solvent is recovered from the upper end, and wherein the silica-filled rubber crumb is recovered from the lower end as particles suspended in an aqueous solution, and further comprising separating the particles from the aqueous solution.

14. The process of claim 5, wherein the nonpolar organic solvent is hexane or cyclohexane.

15. The process of claim 14, wherein the silane coupling agent is selected from the group consisting of: bis-(3-triethoxysilylpropyl)-disulfide (TESPD), bis-(3-triethoxysilylpropyl)-tetrasulfide and 3-mercaptopropyltriethoxysilane (MPTES).

16. The process of claim 12, wherein the solution-rubber solution comprises one or more of the following rubber materials: styrene-butadiene rubber, natural rubber, neoprene rubber, acrylonitrile butadiene rubber, polybutadiene rubber, vinyl pyridine butadiene rubber, styrene butadiene termonomer rubber, EPDM, chloroprene, HNBR, SBS and functionalized and/or hydrogenated versions of the foregoing rubber materials.

17. A process for making a silica masterbatch with both solution rubber and emulsion rubber, comprising the steps of:
(a) operating the process according to claim 15, wherein the silica-filled rubber crumb is made into wet or dry crumbs;
(b) making an emulsion rubber latex;
(c) mixing silica-filled rubber crumb into the emulsion rubber latex, thereby forming a polymer latex;
(d) coagulating the polymer latex from step (c); and
(e) recovering a silica-filled rubber masterbatch that comprises a mixture of silica, emulsion-made rubber and solution-made rubber.

18. The process of claim 17, wherein the process further comprises mixing a hydrophobated silica aqueous solution into the polymer latex before coagulating the polymer latex.

19. The process of claim 17, wherein the process further comprises mixing a process oil into the polymer latex to provide 25-50 phr of process oil in the silica-filled rubber masterbatch.

20. A process for making a silica masterbatch containing emulsion rubber and solution rubber, comprising the steps of:
(a) operating the process of claim 1, wherein the silica-filled rubber crumb is a wet or a dry crumb;
(b) obtaining an emulsion rubber crumb;
(c) homogenizing the silica-filled rubber crumb and the emulsion rubber crumb to form a mixture; and
(d) drying and baling the mixture, thereby forming the silica masterbatch that contains silica, emulsion rubber and solution rubber.

21. The process of claim 20, wherein the silica-filled rubber crumb is wet and contains from about 10% to about 25% solids by weight.

22. The process of claim 1, wherein the silane coupling agent is a triethoxy silane coupling agent or a mixture of triethoxy and trimethoxy silane coupling agents.

23. The process of claim 1, wherein the total silica is between about 50 and about 150 parts per 100 parts of rubber.

24. The process of claim 23, wherein the silica has a BET surface area of between about 200 and 400 $m^2/g$.

* * * * *